United States Patent
Kuo et al.

(10) Patent No.: US 9,882,240 B2
(45) Date of Patent: Jan. 30, 2018

(54) GRAFT COPOLYMER, PROCESS FOR PRODUCING THE GRAFT COPOLYMER, PROCESS FOR PREPARING A GEL POLYMER ELECTROLYTE INCLUDING THE GRAFT COPOLYMER, AND INTERMEDIATE COPOLYMER OF THE GRAFT COPOLYMER

(71) Applicant: NATIONAL CHENG KUNG UNIVERSITY, Tainan (TW)

(72) Inventors: Ping-Lin Kuo, Tainan (TW); Sheng-Shu Hou, Tainan (TW); Chung-Yu Lu, Tainan (TW); Ching-An Wu, Tainan (TW); Chih-Hao Tsao, Tainan (TW); Chun-Han Hsu, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 168 days.

(21) Appl. No.: 14/456,343

(22) Filed: Aug. 11, 2014

(65) Prior Publication Data
US 2016/0043434 A1    Feb. 11, 2016

(51) Int. Cl.
*H01M 10/52* (2006.01)
*H01M 10/0565* (2010.01)
(Continued)

(52) U.S. Cl.
CPC ......... *H01M 10/0565* (2013.01); *B01J 41/13* (2017.01); *C08F 283/065* (2013.01);
(Continued)

(58) Field of Classification Search
None
See application file for complete search history.

(56) References Cited

U.S. PATENT DOCUMENTS

| 4,563,404 A | * | 1/1986 | Bahary | H01M 4/06 252/182.1 |
| 6,841,303 B2 | * | 1/2005 | Park | H01M 6/181 252/62.2 |
| 2013/0136998 A1 | | 5/2013 | Hwang et al. | |

OTHER PUBLICATIONS

Temel Ozturk and Ismail Cakmak. "Synthesis of Block Copolymers via Redox Polymerization Process: A Critical Review." Iranian Polymer Journal 16 (8), 2007, 561-581.

* cited by examiner

Primary Examiner — Tracy Dove
(74) Attorney, Agent, or Firm — Merchant & Gould P.C.

(57) ABSTRACT

A graft copolymer comprising a backbone polymer and a branched-chain polymer, and represented by formula (I),

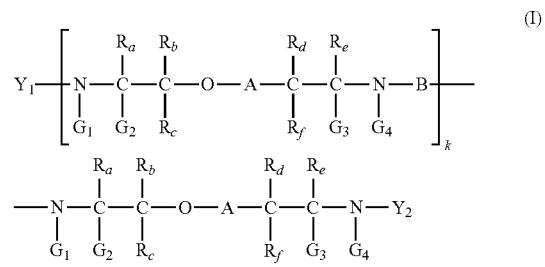

where A, B, $R_a$, $R_b$, $R_c$, $R_d$, $R_e$, $R_f$, $G_1$, $G_2$, $G_3$, $G_4$, $Y_1$, $Y_2$, and k are as defined in the specification. A process for producing the grate copolymer, a process for preparing a gel polymer electrolyte including the graft copolymer, and an intermediate copolymer of the graft copolymer are also disclosed.

8 Claims, 20 Drawing Sheets

(51) Int. Cl.
*C08G 73/02* (2006.01)
*H01M 10/052* (2010.01)
*H01M 4/62* (2006.01)
*C08F 283/06* (2006.01)
*B01J 41/13* (2017.01)

(52) U.S. Cl.
CPC .......... *C08G 73/024* (2013.01); *H01M 4/622* (2013.01); *H01M 10/052* (2013.01); *H01M 2300/0085* (2013.01)

GRAFT COPOLYMER, PROCESS FOR PRODUCING THE GRAFT COPOLYMER, PROCESS FOR PREPARING A GEL POLYMER ELECTROLYTE INCLUDING THE GRAFT COPOLYMER, AND INTERMEDIATE COPOLYMER OF THE GRAFT COPOLYMER

FIELD OF THE INVENTION

This invention relates to a graft copolymer, a process for producing the graft copolymer, a process for preparing a gel polymer electrolyte including the graft copolymer, and an intermediate copolymer of the graft copolymer for serving as a binder of a lithium battery electrode.

BACKGROUND OF THE INVENTION

U.S. Pat. No. 6,841,303 B2 discloses ionic gel polymer electrolytes for rechargeable polymer batteries. The ionic gel polymer electrolytes are formed by dissolving a gelling agent into organic liquid electrolytes, and then gelling the precursor in situ at elevated temperature after pouring it into a battery case that contains a cathode, an anode and a separator.

US patent application publication no. 2013/0136998 A1 discloses an electrolyte composition including a macro azo initiator containing a polyethylene oxide repeating unit, and a multi-functional urethane acrylate-based monomer. A gel polymer electrolyte including the electrolyte composition, and a lithium battery including the gel polymer electrolyte are also disclosed.

In a paper entitled "synthesis of block copolymers via Redox polymerization process: a critical review," Iranian polymer Journal 16(8), 2007, 561-581, it is disclosed the synthesis of polyacrylonitrile-b-poly(ethylene oxide) (PAN-b-PEO) diblock copolymers, and PAN-poly(ethylene glycol)-PAN (PAN-PEG-PAN) triblock copolymers.

SUMMARY OF THE INVENTION

An object of the present invention is to provide a novel graft copolymer, a process for producing the graft copolymer, a process for preparing a gel polymer electrolyte including the graft copolymer, and an intermediate copolymer of the graft copolymer for serving as a binder for a lithium battery electrode. The gel polymer electrolyte can be used in a lithium battery to act as an ionic conductor as well as a separator that separates an anode and a cathode of the lithium battery.

According to a first aspect of this invention, a graft copolymer includes a backbone polymer and a branched-chain polymer, and is represented by formula (I), where:
A is represented by $-(X_1)_n-$ and is independently of each repeating unit, in which n is an integral not less than zero, and $X_1$ is represented by

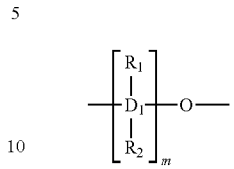

and is independently of each repeating unit, in which $D_1$ is a carbon atom or a silicon atom, $R_1$ and $R_2$ are independently $-CH_3$, H, or F when $D_1$ is a carbon atom, and are independently $-CH_3$, -phenyl, $-OCH_3$, or $-OC_2H_5$ when $D_1$ is a silicon atom, and m is 1 or 2;
B is represented by

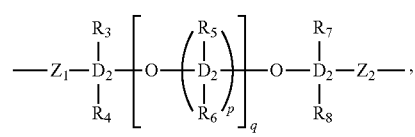

in which $D_2$ is a carbon atom or a silicon atom, $R_3$, $R_4$, $R_5$, $R_6$, $R_7$, and $R_8$ are independently $-CH^3$, H, or F when $D_2$ is a carbon atom, and are independently $-CH_3$, -phenyl, $-OCH_3$, or $-OC_2H$; when $D_2$ is a silicon atom, p is 1 or 2, q is an integral not less than 1, $Z_1$ is

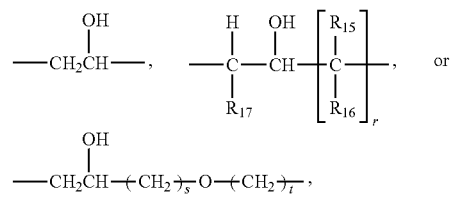

in which $R_{15}$ and $R_{16}$ are independent for each repeating unit, $R^{15}$, $R_{16}$, and $R^{17}$ are independently H or alkyl, and r, s, and t are each an integral not less than 1, and $Z_i$ is

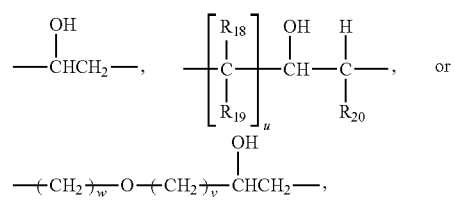

in which $R_{18}$ and $R_{19}$ are independent for each repeating unit, $R_{18}$, $R_{19}$, and $R_{20}$ are independently H or alkyl, and u, v, and w are each an integral not less than 1;

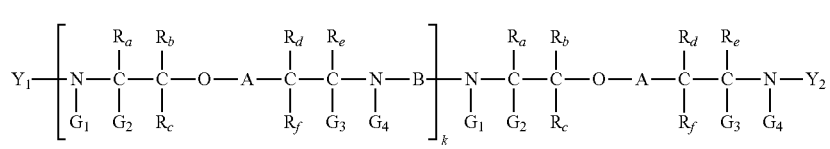

$R_a$, $R_b$, $R_c$, $R_d$, $R_e$ and $R_f$ are independently H or alkyl;
k is an integral not less than 1; and
$G_1$, $G_2$, $G_3$, and $G_4$ are independent for each repeating unit, and $G_1$, $G_2$, $G_3$, $G_4$, $Y_1$, and $Y_2$ are independently H, alkyl, or a polymer chain selected from the group consisting of polyacrylonitrile and a derivative thereof, polyvinylsulfonic acid and a derivative thereof, polyacrylate and a derivative thereof, and polyvinylphosphonic acid and a derivative thereof.

According to a second aspect of this invention, a process for preparing a gel polymer electrolyte includes a step of soaking the graft copolymer with a lithium ion containing electrolyte.

According to a third aspect of this invention, a process for producing a graft copolymer includes the steps of:

(a) preparing a prepolymer having a formula (II),

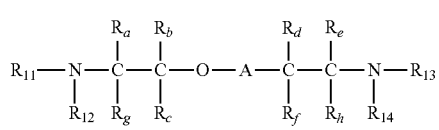
(II)

where

A is represented by $-(X_1)_n-$, in which n is an integral not less than zero, and $X_1$ is represented by

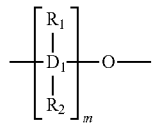

and is independently of each repeating unit, in which: $D_1$ is a carbon atom or a silicon atom; $R_1$ and $R_2$ are independently —$CH_3$, H, or F when $D_1$ is a carbon atom, and are independently —$CH_3$, -phenyl, —$OCH_3$, or —$OC_2H_5$ when $D_1$ is a silicon atom; and m is 1 or 2, and $R_a$, $R_b$, $R_c$, $R_d$, $R_e$, $R_f$, $R_g$, $R_h$, $R_{11}$, $R_{12}$, $R_{13}$, and $R_{14}$ are independently H or alkyl;

(b) subjecting a mixture of the prepolymer and monomers to a polymerization to form an intermediate copolymer, the monomers being selected from the group consisting of acrylonitrile and a derivative thereof, vinylsulfonic acid and a derivative thereof, acrylate and a derivative thereof, vinylphosphonic acid and a derivative thereof, and combinations thereof; and (c) using a crosslinking agent to bridge the intermediate copolymer and an additional prepolymer having the above formula (II), the crosslinking agent having a formula (III), where

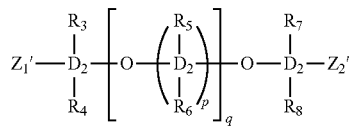
(III)

$D_2$ is a carbon atom or a silicon atom, $R_3$, $R_4$, $R_5$, $R_6$, $R_7$, and $R_8$ are independently —$CH_3$, H, or F when $D_2$ is a carbon atom, and are independently —$CH_3$, -phenyl, —$OCH_3$, or —$OC_2H_5$ when $D_2$ is a silicon atom, p is 1 or 2,
q is an integral not less than 1,
$Z_1'$ is

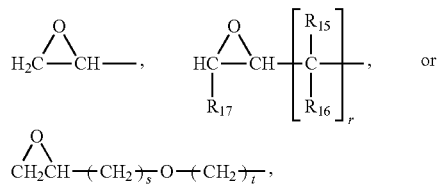

in which $R_{15}$ and $R_{16}$ are independent for each repeating unit, $R_{15}$, $R_{16}$, and $R_{17}$ are independently H or alkyl, and r, s, and t are each an integral not less than 1, and $Z_2'$ is

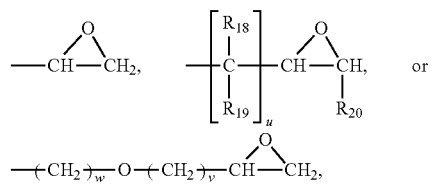

in which $R_{18}$ and $R_{19}$ are independent for each repeating unit, $R_{18}$, $R_{19}$, and $R_{20}$ are independently H or alkyl, and u, v, and w are each an integral not less than 1.

According to a fourth aspect of this invention, an intermediate copolymer is represented by formula (V),

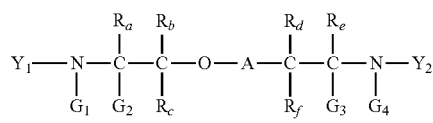
(V)

where

A is represented by $-(X_1)_n-$, in which n is an integral not less than zero, and $X_1$ is represented by

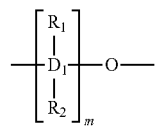

and is independently of each repeating unit, in which $D_1$ is a carbon atom or a silicon atom, $R_1$ and $R_2$ are independently —$CH_3$, H, or F when $D_1$ is a carbon atom, and are independently —$CH_3$, -phenyl, —$OCH_3$, or —$OC_2H_5$ when $D_1$ is a silicon atom, and m is 1 or 2;

$R_a$, $R_b$, $R_c$, $R_d$, $R_e$, and $R_f$ are independently H or alkyl; and $G_1$, $G_2$, $G_3$, $G_4$, $Y_1$, and $Y_2$ are independently H, alkyl, or a polymer chain selected from the group consisting of polyacrylonitrile and a derivative thereof, polyvinylsulfonic acid and a derivative thereof, polyacrylate and a derivative thereof, and polyvinylphosphonic acid and a derivative thereof.

According to a fifth aspect of this invention, a binder for a lithium battery electrode includes the intermediate copolymer.

BRIEF DESCRIPTION OF THE DRAWINGS

Other features and advantages of the present invention will become apparent in the following detailed description of the embodiments of the invention, with reference to the accompanying drawings, in which:

FIG. 7(*b*) shows AC-impedance spectra for the coin cell type batteries of Example 12 and Comparative Examples 5 and 6, after three charge-discharge cycles;

DETAILED DESCRIPTION OF THE EMBODIMENTS

Figure 1:
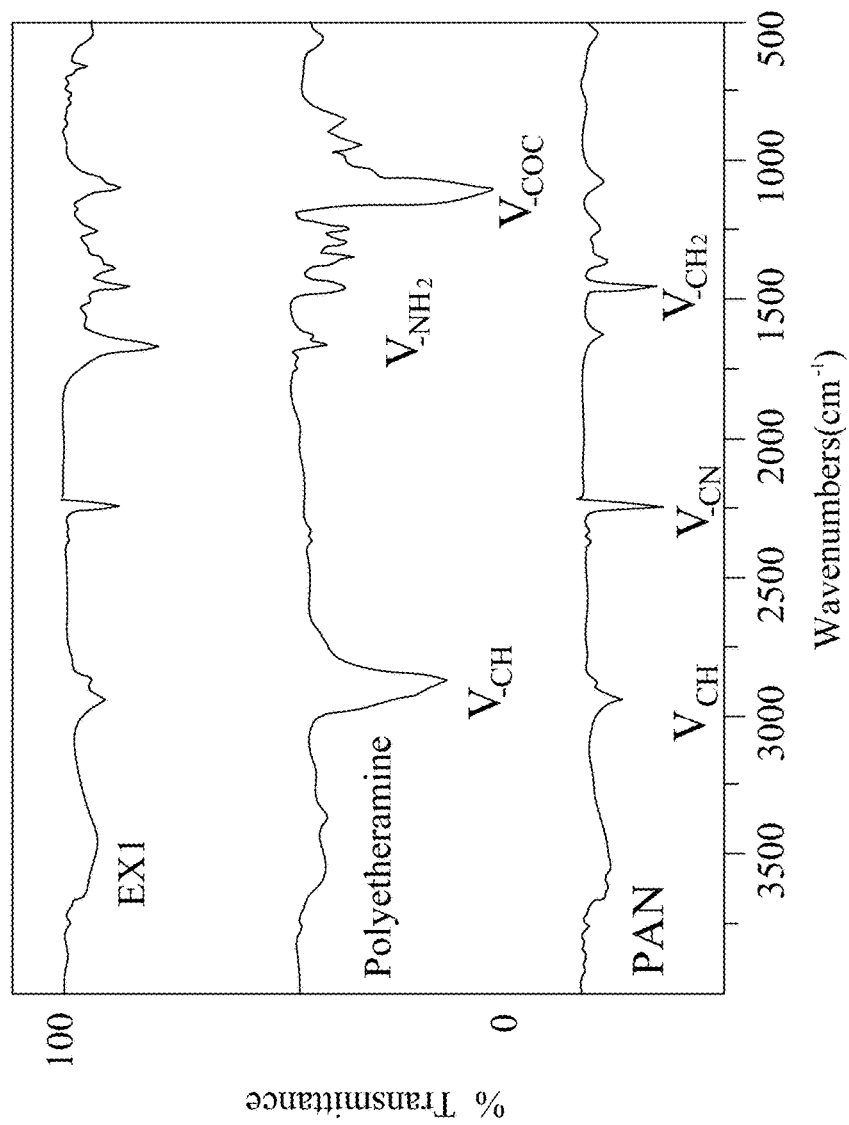
FIG. 1 shows IR spectra for an intermediate copolymer of Example 1, polyetheramine, and polyacrylonitrile.

A graft copolymer according to an embodiment of the present invention includes a backbone polymer and a branched-chain polymer, and is represented by formula (I), where:

A is represented by $-(X_1)_n-$ and is independently of each repeating unit, in which n is an integral not less than zero, and $X_1$, is represented by

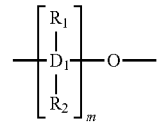

and is independently of each repeating unit, in which
$D_1$ is a carbon atom or a silicon atom,
$R_1$ and $R_2$ are independently $-CH_3$, H, or F when $D_1$ is a carbon atom, and are independently $-CH_3$, -phenyl, $-OCH_3$, or $-OC_2H_5$ when $D_1$ is a silicon atom, and
m is 1 or 2;

B is represented by

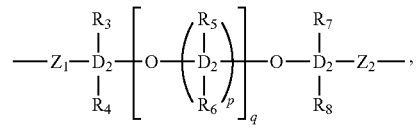

in which
$D_2$ is a carbon atom or a silicon atom,
$R_3$, $R_4$, $R_5$, $R_6$, $R_7$, and R are independently $-CH_3$, H, or F when $D_2$ is a carbon atom, and are independently $-CH_3$, -phenyl, $-OCH_3$, or $-OC_2H_5$ when $D_2$ is a silicon atom,
p is 1 or 2,
q is an integral not less than 1,
$Z_1$ is

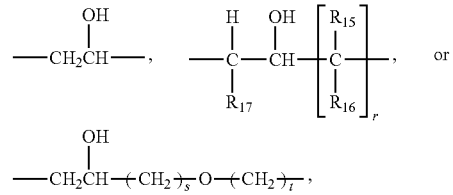

in which $R_{15}$ and $R_{16}$ are independent for each repeating unit, $R_{15}$, $R_{16}$, and $R_{17}$ are independently H or alkyl, and r, s, and t are each an integral not less than 1, and
$Z_2$ is

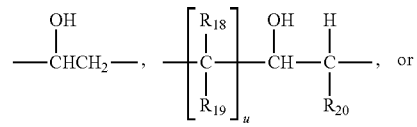

(I)

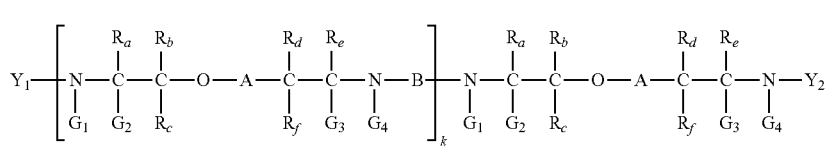

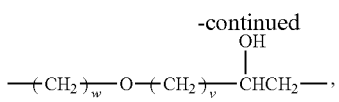

in which $R_{18}$ and $R_{19}$ are independent for each repeating unit, $R_{18}$, $R_{19}$, and $R_{20}$ are independently H or alkyl, and u, v, and w are each an integral not less than 1;

$R_a$, $R_b$, $R_c$, $R_d$, $R_e$, and $R_f$ are independently H or alkyl; k is an integral not less than 1; and $G_1$, $G_2$, $G_3$, and $G_4$ are independent for each repeating unit, and $G_1$, $G_2$, $G_3$, $G_4$, $Y_1$, and $Y_2$ are independently H, alkyl, or a polymer chain selected from the group consisting of polyacrylonitrile and a derivative thereof, polyvinylsulfonic acid and a derivative thereof, polyacrylate and a derivative thereof, and polyvinylphosphonic acid and a derivative thereof.

Preferably, A is represented by

where x, y, and z are each an integral not less than zero.

Preferably, B is represented by

where q is defined as above.

Preferably, the polymer chain is polyacrylonitrile. In at least one of the repeating units, at least one of $G_1$, $G_2$, $G_3$, and $G_4$ is the polymer chain.

Preferably, $R_a$ and $R_e$ are each a methyl group, and $R_b$, $R_c$, $R_d$, and $R_f$ are each hydrogen atom.

A process for producing a graft copolymer according to an embodiment of the present invention includes steps (a) to (c).

In step (a), a prepolymer having a formula (II) is prepared,

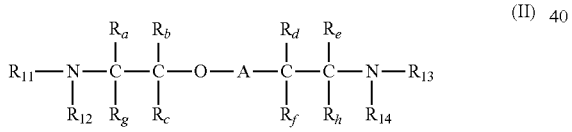

where

A, $R_a$, $R_b$, $R_c$, $R_d$, $R_e$, and $R_f$ are as defined above, and $R_g$, $R_h$, $R_{11}$, $R_{12}$, $R_{13}$, and $R_{14}$ are independently H or alkyl.

Preferably, the prepolymer is polyetheramine having a formula (IV),

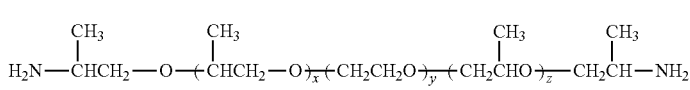

where each of x, y, and z is an integral not less than zero.

In step (b), a mixture of the prepolymer and monomers is subjected to a polymerization to form an intermediate copolymer. The monomers are selected from the group consisting of acrylonitrile and a derivative thereof, vinylsulfonic acid and a derivative thereof, acrylate and a derivative thereof, vinylphosphonic acid and a derivative thereof, and combinations thereof.

Preferably, the monomers are acrylonitrile.

The intermediate copolymer is represented by formula (V),

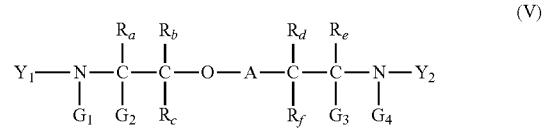

where A, $R_a$, $R_b$, $R_c$, $R_d$, $R_e$, $R_f$, $G_1$, $G_2$, $G_3$, $G_4$, $Y_1$, and $Y_2$ are as defined above.

Preferably, at least one of $G_1$ and $G_2$ is the polymer chain, and at least one of $G_3$ and $G_4$ is the polymer chain. In this embodiment, each of $G_1$ and $G_4$ is the polymer chain, and the polymer chain is polyacrylonitrile.

In step (c), a crosslinking agent is used to bridge the intermediate copolymer and an additional prepolymer having the above formula (II) so as to produce the graft copolymer represented by the above formula (I).

The crosslinking agent has a formula (III),

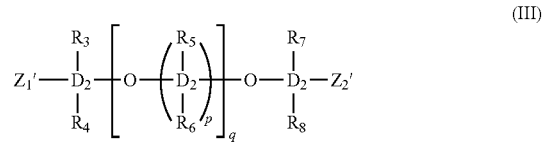

where $D_2$, $R_3$, $R_4$, $R_5$, $R_6$, $R_7$, $R_8$, p, and q are as defined above, $Z_1'$ is

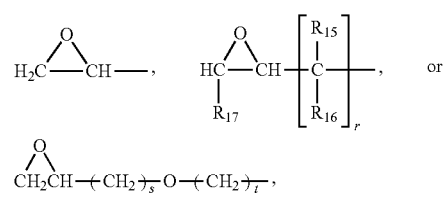

in which $R_{15}$, $R_{16}$, $R_{17}$, r, s, and t are as defined above, and $Z_2'$ is

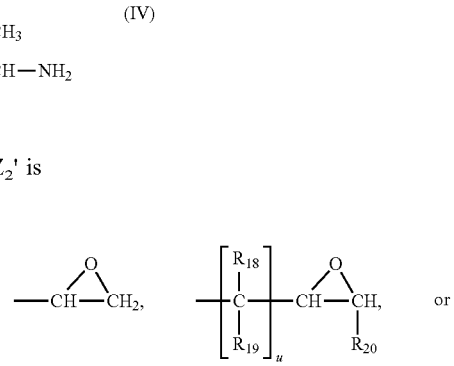

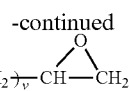

in which $R_{18}$, $R_{19}$, $R_{20}$, u, w, and v are as defined above.

Preferably, the crosslinking agent is poly(ethylene glycol) diglycidyl ether (PEGDE) or epoxy-modified poly(dimethylsiloxane).

A process for preparing a gel polymer electrolyte according to an embodiment of the present invention includes a step of soaking the graft copolymer represented by the above formula (I) with a lithium ion containing electrolyte.

Preferably, the lithium ion containing electrolyte includes lithium hexafluorophosphate ($LiPF_6$).

A binder for a lithium battery electrode according to an embodiment of the present invention includes the intermediate copolymer.

A lithium battery according to an embodiment of the present invention includes an anode, a cathode, and the above-mentioned gel polymer electrolyte which is disposed between the anode and the cathode. In this embodiment, the lithium battery is a lithium-ion rechargeable battery, which uses lithium iron phosphate ($LiFePO_4$) as a cathode material, and a lithium metal as an anode material.

The present invention will now be explained in more detail below by way of the following examples and comparative examples.

Intermediate Copolymer

Example 1 (EX 1)

Polyetheramine (Jeffamine ED series, XTJ-502) was placed in a flask and was dissolved in water, and nitrogen gas was introduced into the flask for 30 minutes. Thereafter, acrylonitrile was added into the flask to obtain a reaction mixture. Ceric ammonium nitrate in 0.15N nitric acid was added dropwise to the reaction mixture, and polymerization was allowed to proceed with stirring for 6 hours to obtain a precipitated copolymer. The precipitated copolymer was washed three times with water, and dried at room temperature in vacuum for 48 hours. Next, the copolymer was dissolved in dimethylformamide (DMF) and precipitated with isopropyl alcohol. Then, the copolymer was washed three times with water, and dried at room temperature in vacuum for 48 hours to obtain an intermediate copolymer.

Polymer Membrane

Example 2 (EX 2)

The intermediate copolymer obtained in Example 1 and polyetheramine (Jeffamine ED series, XTJ-502) were dissolved in DMF to obtain a DMF solution in which a molar ratio of acrylonitrile (AN) to —$CH_2CH_2O$— chain (EO) was 0.25. Poly(ethylene glycol) diglycidyl ether (PEGDE) (Kyoeisha Chemical Co., Ltd.) and the DMF solution were mixed and stirred for 5 hours to obtain a mixture. The mixture was poured onto an aluminum plate, and cured at 80° C. for 12 hours to obtain a graft copolymer membrane.

Example 3 (EX 3)

A graft copolymer membrane of Example 3 was prepared according to a procedure similar to that described in Example 2, except that the molar ratio of AN to EO in the DMF solution was 0.35.

Example 4 (EX 4)

A graft copolymer membrane of Example 4 was prepared according to a procedure similar to that described in Example 2, except that the molar ratio of AN to EO in the DMF solution was 0.5.

Example 5 (EX 5)

A graft copolymer membrane of Example 5 was prepared according to a procedure similar to that described in Example 2, except that the molar ratio of AN to EO in the DMF solution was 0.65.

Example 6 (EX 6)

A graft copolymer membrane of Example 6 was prepared according to a procedure similar to that described in Example 2, except that the molar ratio of AN to EO in the DMF solution was 0.75.

Comparative Example 1 (CE 1)

A commercial separator (Celgard M824) was used for evaluation.

Comparative Example 2 (CE 2)

A polymer membrane of Comparative Example 2 was prepared according to a procedure similar to that described in Example 2, except that the DMF solution did not include the intermediate copolymer of Example 1.

Coin Cell Type Battery for Electrochemical Stability Test

Example 7 (EX 7)

The graft copolymer membrane obtained in Example 2 was soaked in a LiPFE electrolyte solution (Ubiq Technology Co., Ltd.) for 24 hours in an argon-filled glovebox to obtain a gel polymer electrolyte. The $LiPF_6$ electrolyte solution had a $LiPF_6$ concentration of 1.0M in ethylene carbonate (EC)/dimethyl carbonate (DMC)/diethyl carbonate (DEC) (1:1:1 in V/V). A coin cell type battery was assembled in a dry, oxygen free glovebox. In the coin cell type battery, the gel polymer electrolyte served as a separator, a lithium foil served as a counter and reference electrode, and a stainless steel disc served as a working electrode.

Example 8 (EX 8)

A coin cell type battery of Example 8 was prepared according to a procedure similar to that described in Example 7, except that the graft copolymer membrane obtained in Example 3 was used to replace the graft copolymer membrane of Example 2.

Example 9 (EX 9)

A coin cell type battery of Example 9 was prepared according to a procedure similar to that described in Example 7, except that the graft copolymer membrane obtained in Example 4 was used to replace the graft copolymer membrane of Example 2.

Example 10 (EX 10)

A coin cell type battery of Example 10 was prepared according to a procedure similar to that described in Example 7, except that the graft copolymer membrane obtained in Example 5 was used to replace the graft copolymer membrane of Example 2.

Example 11 (EX 11)

A coin cell type battery of Example 11 was prepared according to a procedure similar to that described in Example 7, except that the graft copolymer membrane obtained in Example 6 was used to replace the graft copolymer membrane of Example 2.

Comparative Example 3 (CE 3)

A coin cell type battery of Comparative Example 3 was prepared according to a procedure similar to that described in Example 7, except that the commercial separator of Comparative Example 1 was used to replace the graft copolymer membrane of Example 2.

Comparative Example 4 (CE 4)

A coin cell type battery of Comparative Example 4 was prepared according to a procedure similar to that described in Example 7, except that the polymer membrane obtained in Comparative Example 2 was used to replace the graft copolymer membrane of Example 2.

Coin Cell Type Battery for Compatibility Test

Example 12 (EX 12)

The graft copolymer membrane obtained in Example 4 was soaked in the above-mentioned LiPFE electrolyte solution for 24 hours in an argon-filled glovebox to obtain a gel polymer electrolyte.

A slurry mixture was prepared by adding 80 wt % LiFePO$_4$ powder (Aleees Advanced Lithium Electrochemistry Co. Ltd., Taiwan), 10 wt % conductive carbon black (Super P from Timcal), and 10 wt % polyvinylidene fluoride (PVDF) to N-methyl-2-pyrrolidone (NMP), followed by stirring for 24 hours. A LiFePO$_4$ positive electrode was prepared by coating the slurry mixture evenly onto a high purity aluminum foil, drying at 100° C. for 24 hours in vacuum to obtain an electrode film, pressing the electrode film evenly using a rolling machine, and then cutting the electrode film into a positive electrode disc (diameter Φ=13 mm).

A coin cell type battery having the gel polymer electrolyte sandwiched between the LiFePO$_4$ positive electrode and a lithium metal electrode was assembled in the glovebox.

Comparative Example 5 (CE 5)

A coin cell type battery of Comparative Example 5 was prepared according to a procedure similar to that described in Example 12, except that the commercial separator of Comparative Example 1 was used to replace the graft copolymer membrane of Example 4.

Comparative Example 6 (CE 6)

A coin cell type battery of Comparative Example 6 was prepared according to a procedure similar to that described in Example 12, except that the polymer membrane obtained in Comparative Example 2 was used to replace the graft copolymer membrane of Example 4.

Coin Cell Type Battery for Ionic Conductivity Test

Example 13 (EX 13)

The graft copolymer membrane obtained in Example 2 was soaked in the above-mentioned LiPFE electrolyte solution for 24 hours in an argon-filled glovebox to obtain a gel polymer electrolyte. A coin cell type battery having the gel polymer electrolyte sandwiched between two parallel stainless steel discs (diameter Φ=16 mm) was assembled in the glovebox.

Example 14 (EX 14)

A coin cell type battery of Example 14 was prepared according to a procedure similar to that described in Example 13, except that the graft copolymer membrane obtained in Example 3 was used to replace the graft copolymer membrane of Example 2.

Example 15 (EX 15)

A coin cell type battery of Example 15 was prepared according to a procedure similar to that described in Example 13, except that the graft copolymer membrane obtained in Example 4 was used to replace the graft copolymer membrane of Example 2.

Example 16 (EX 16)

A coin cell type battery of Example 16 was prepared according to a procedure similar to that described in Example 13, except that the graft copolymer membrane obtained in Example 5 was used to replace the graft copolymer membrane of Example 2.

Example 17 (EX 17)

A coin cell type battery of Example 17 was prepared according to a procedure similar to that described in Example 13, except that the graft copolymer membrane obtained in Example 6 was used to replace the graft copolymer membrane of Example 2.

Comparative Example 7 (CE 7)

A coin cell type battery of Comparative Example 7 was prepared according to a procedure similar to that described in Example 13, except that the commercial separator of Comparative Example 1 was used to replace the graft copolymer membrane of Example 2.

Comparative Example 8 (CE 8)

A coin cell type battery of Comparative Example 8 was prepared according to a procedure similar to that described in Example 13, except that the polymer membrane obtained in Comparative Example 2 was used to replace the graft copolymer membrane of Example 2.

Coin Cell Type Battery for Battery Capacity Test

Example 18 (EX 18)

The graft copolymer membrane obtained in Example 2 was soaked in the above-mentioned LiPF$_6$ electrolyte solution for 24 hours in an argon-filled glovebox to obtain a gel polymer electrolyte.

A slurry mixture was prepared by adding 80 wt % LiFePO$_4$ powder (Aleees Advanced Lithium Electrochemistry Co. Ltd., Taiwan), 10 wt % conductive carbon black (Super P from Timcal), and 10 wt % polyvinylidene fluoride (PVDF) to N-methyl-2-pyrrolidone (NMP), followed by stirring for 24 hours. A cathode was prepared by coating the slurry mixture evenly onto a high purity aluminum foil, drying at 100° C. for 24 hours in vacuum to obtain a cathode film, pressing the cathode film evenly using a rolling machine, and then cutting the cathode film into a cathode disc (diameter Φ=13 mm). A high purity lithium metal served as an anode.

A coin cell type battery having the gel polymer electrolyte sandwiched between the cathode and the anode was assembled in the glovebox.

Example 19 (EX 19)

A coin cell type battery of Example 19 was prepared according to a procedure similar to that described in Example 18, except that the graft copolymer membrane obtained in Example 3 was used to replace the graft copolymer membrane of Example 2.

Example 20 (EX 20)

A coin cell type battery of Example 20 was prepared according to a procedure similar to that described in Example 18, except that the graft copolymer membrane obtained in Example 4 was used to replace the graft copolymer membrane of Example 2.

Example 21 (EX 21)

A coin cell type battery of Example 21 was prepared according to a procedure similar to that described in Example 18, except that the graft copolymer membrane obtained in Example 5 was used to replace the graft copolymer membrane of Example 2.

Example 22 (EX 22)

A coin cell type battery of Example 22 was prepared according to a procedure similar to that described in Example 18, except that the graft copolymer membrane obtained in Example 6 was used to replace the graft copolymer membrane of Example 2.

Comparative Example 9 (CE 9)

A coin cell type battery of Comparative Example 9 was prepared according to a procedure similar to that described in Example 18, except that the commercial separator of Comparative Example 1 was used to replace the graft copolymer membrane of Example 2.

Comparative Example 10 (CE 10)

A coin cell type battery of Comparative Example 10 was prepared according to a procedure similar to that described in Example 18, except that the polymer membrane obtained in Comparative Example 2 was used to replace the graft copolymer membrane of Example 2.

Coin Cell Type Battery for Positive Electrode Test

Example 23 (EX 23)

A slurry mixture was prepared by adding 80 wt % LiFePO$_4$ powder (Aleees Advanced Lithium Electrochemistry Co. Ltd., Taiwan), 10 wt % conductive carbon black (Super P from Timcal), and 10 wt % binder to N-methyl-2-pyrrolidone (NMP), followed by stirring for 24 hours. The intermediate copolymer obtained in Example 1 served as the binder.

A positive electrode was prepared by coating the slurry mixture evenly onto a high purity aluminum foil, drying at 100° C. for 24 hours in vacuum to obtain an electrode film, pressing the electrode film evenly using a rolling machine, and then cutting the electrode film into a positive electrode disc (diameter Φ=13 mm). A high purity lithium metal served as a negative electrode.

The commercial separator of Comparative Example 1 was soaked in the above-mentioned LiPF$_6$ electrolyte solution for 24 hours in an argon-filled glovebox to obtain a polymer electrolyte.

A coin cell type battery having the polymer electrolyte sandwiched between the positive and negative electrodes was assembled in the glovebox.

Comparative Example 11 (CE 11)

A coin cell type battery of Comparative Example 11 was prepared according to a procedure similar to that described in Example 23, except that a conventional binder (10 wt % polyvinylidene fluoride (PVDF)) was used to replace the binder used in Example 23.

Coin Cell Type Battery for Graphite Electrode Test

Example 24 (EX 24)

A slurry mixture was prepared by adding 92 wt % natural graphite (Long Time Tech, Taiwan), 2 wt % conductive carbon black (Super P from Timcal), and 6 wt % binder to N-methyl-2-pyrrolidone (NMP), followed by stirring for 24 hours. The intermediate copolymer obtained in Example 1 served as the binder.

A graphite electrode was prepared by coating the slurry mixture evenly onto a high purity nickel foil, drying at 100° C. for 24 hours in vacuum to obtain an electrode film, pressing the electrode film evenly using a rolling machine, and then cutting the electrode film into a graphite electrode disc (diameter 0=13 mm). A high purity lithium metal served as a reference and counter electrode.

The commercial separator of Comparative Example 1 was soaked in the above-mentioned LiPFE electrolyte solution for 24 hours in an argon-filled glovebox to obtain a polymer electrolyte.

A coin cell type battery having the polymer electrolyte sandwiched between the graphite electrode and the lithium metal electrode was assembled in the glovebox.

Comparative Example 12 (CE 12)

A coin cell type battery of Comparative Example 12 was prepared according to a procedure similar to that described in Example 24, except that a conventional binder (6 wt % polyvinylidene fluoride (PVDF)) was used to replace the binder used in Example 24.

<Evaluation>

FT-IR Analysis

The intermediate copolymer of Example 1 and an IR transparent crystal (potassium bromide) were mixed and ground into fine powders, and then the mixture was pressurized to obtain a test sample. The test sample was placed in an oven (80° C.) for 24 hours. Thereafter, the test sample was analyzed by FT-IR (NICOLET Magna II 550 spectrometer) at room temperature in a wavelength range between 4000 $cm^{-1}$ and 500 $cm^{-1}$. The result is shown in FIG. 1.

In FIG. 1, the IR spectra of polyetheramine and polyacrylonitrile (PAN) are also shown. In the IR spectrum of the intermediate copolymer of Example 1, the peak at 2850 $cm^{-1}$ was the result of the $CH_2$ stretching vibration of EO chain (—$CH_2CH_2O$— chain) of polyetheramine, the bands at 1450 $cm^{-1}$ and 1349 $cm^{-1}$ were due to $CH_2$ scissoring and wagging vibration of the polyacrylonitrile, the strong peak at 1100 $cm^{-1}$ was due to the (C—O—C) stretching vibration of polyetheramine, and the strong peak at 2250 $cm^{-1}$ was due to the (—CN) stretching vibration of polyacrylonitrile. Therefore, the intermediate copolymer of Example 1 was confirmed to be a copolymer of polyetheramine and polyacrylonitrile.

Electrolyte Uptake Test

A dried polymer membrane was weighed ($W_{dry}$) and then soaked in the above-mentioned $LiPF_6$ electrolyte solution for 24 hours. Thereafter, the $LiPF_6$ electrolyte solution on surfaces of the polymer membrane was wiped away, followed by weighing the weight of the polymer membrane ($W_{wet}$).

The electrolyte uptake for the polymer membrane is defined as follow:

$$\text{Electrolyte uptake } (\%) = \frac{W_{wet} - W_{dry}}{W_{dry}} \times 100\%$$

The electrolyte uptake results for the polymer membranes of Examples 2 to 6 and Comparative Examples 1 and 2 are listed in Table 1.

TABLE 1

| | EX 2 | EX 3 | EX 4 | EX 5 | EX 6 | CE 1 | CE 2 |
|---|---|---|---|---|---|---|---|
| Electrolyte uptake (%) | 425 | 405 | 345 | 310 | 295 | 200 | 540 |

From the results shown in Table 1, it can be found that the polymer membrane (graft copolymer membranes) of Examples 2 to 6 had excellent electrolyte uptake properties in comparison with that of the commercial separator of Comparative Example 1.

Heat Stability Test

A polymer membrane was analyzed using a thermogravimetric analyzer (Perkin Elmer TGA 7) under a nitrogen atmosphere (heating rate: 20° C./min, 50-600° C.). The results of the thermogravimetric analysis for the polymer membranes of Examples 2 to 6 and Comparative Example 2 are shown in FIG. 2.

Figure 2:
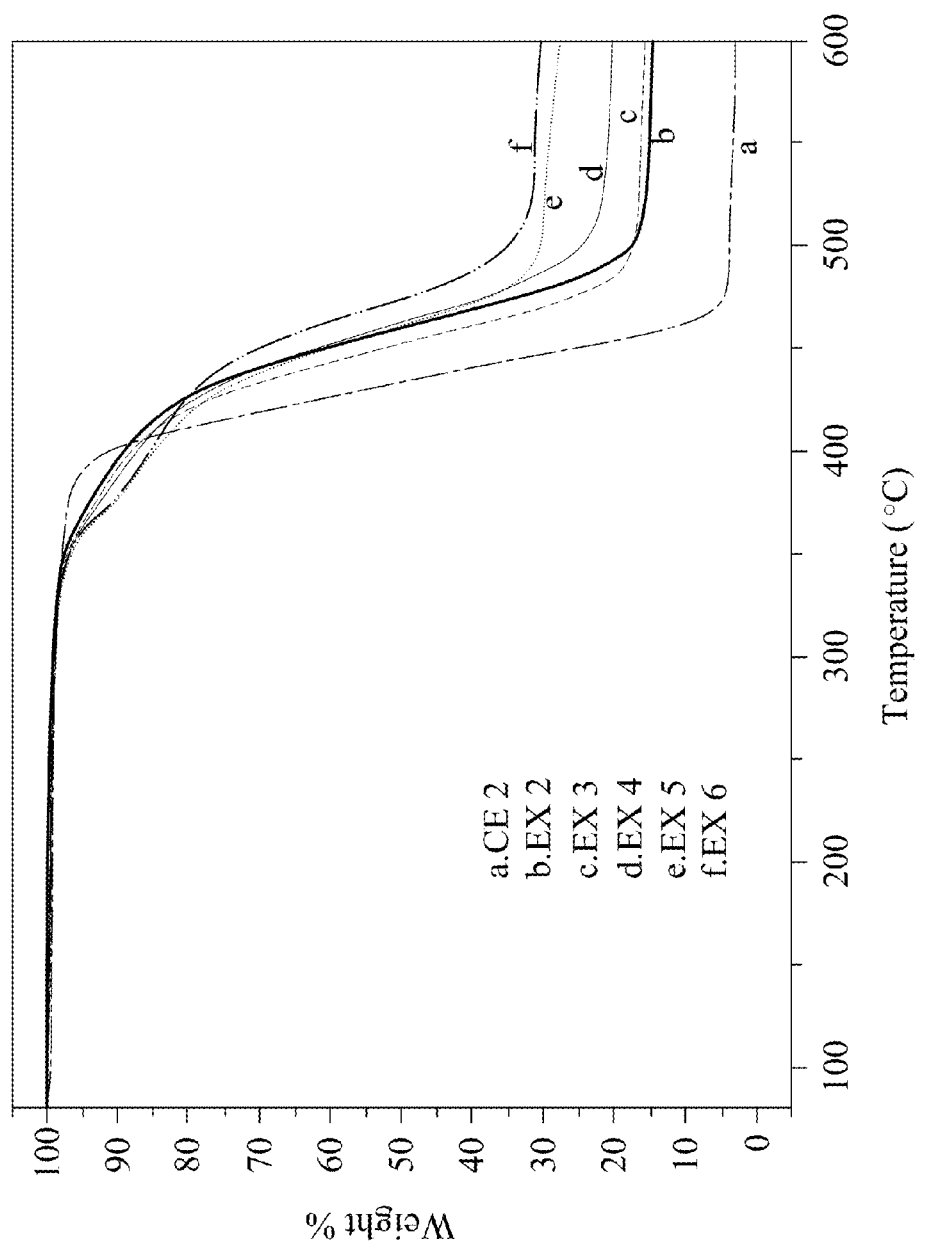
FIG. 2 shows TGA profiles for polymer membranes of Comparative Example 2 and Examples 2 to 6.

In FIG. 2, the polymer membrane (graft copolymer membranes) of Examples 2 to 6 had 85%, 84%, 79%, 73%, and 68% weight loss, respectively, between 350° C. and 600° C. The polymer membrane of Comparative Example 2, in which polyacrylonitrile was not included, had a relatively high weight loss (97%) between 350° C. and 600° C. That is to say, the polymer membranes (graft copolymer membranes) of Examples 2 to 6 can have better heat stability than the polymer membrane of Comparative Example 2. The introduction of the polymer chain (polyacrylnitrole) can enhance the heat stability of the polymer membrane.

Electrochemical Stability Test

An electrochemical stability window of a coin cell type battery was determined by linear sweep voltammetry.

The initial potential was set at 2 V, and the potential was swept continuously to 6 V with a scanning rate of 5 $mVs^{-1}$. The electrochemical stability results (linear sweep voltammetry curves) for the coin cell type batteries of Examples 7 to 11 and Comparative Examples 3 and 4 are shown in FIG. 3.

Figure 3:
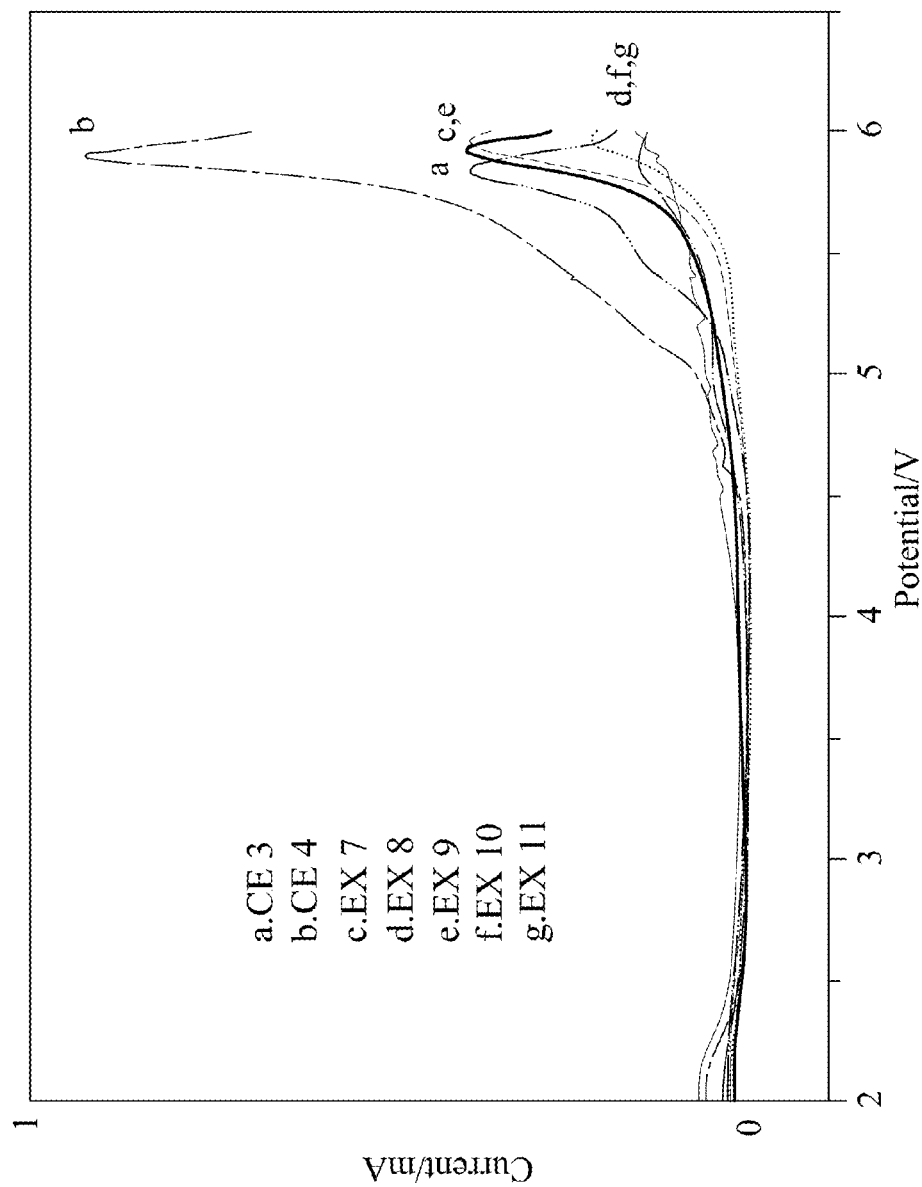
FIG. 3 shows electrochemical windows for coin cell type batteries of Comparative Examples 3 and 4 and Examples 7 to 11.

As shown in FIG. 3, the coin cell type battery of Comparative Example 3 (which had the commercial separator of Comparative Example 1) had an oxidation voltage of about 5.2 V, the coin cell type battery of Comparative Example 4 had an oxidation voltage of about 4.8 V, and the coin cell type batteries of Examples 7 to 11 (which had the graft copolymer membranes of Examples 2 to 6, respectively) had oxidation voltages of about 5.5 V. In comparison with the coin cell type battery of Comparative Examples 3 and 4, the coin cell type batteries of Examples 7 to 11 were more stable and had wider electrochemical windows. This is because electron-drawing functional groups (such as —CN, —$SO_3H$, —$PO_3H_2$, —COO—, etc.) in the graft copolymer membranes can stabilize the chemical structure of the graft copolymer membranes.

Therefore, when the graft copolymer membranes of Examples 2 to 6 are applied in lithium-ion batteries, the lithium-ion batteries will be relatively stable under an operating voltage thereof (2.5 V~4.2 V).

Electrolyte Retention Test 3 mg of the above-mentioned $LiPF_6$ electrolyte solution was soaked up by 4.5 mg of a polymer membrane to obtain an electrolyte sample. The electrolyte sample was analyzed using a thermogravimetric analyzer under a nitrogen atmosphere (heating rate: 20° C./min, 30° C.-150° C.). The results of the thermogravimetric analysis for the polymer membranes of Examples 2 to 6 and Comparative Examples 1 to 2 are shown in FIG. 4.

It should be noted that in the test, the initial weights of the polymer membranes and the $LiPF_6$ electrolyte solution for each of the examples and the comparative examples were the same. At a temperature between 30° C. and 150° C., the polymer membranes of the examples and the comparative examples were less likely to have a weight loss. Thus, if any weight loss was observed, it was due to the poor electrolyte retention of the polymer membranes, which would cause a lithium-ion battery to have combustible gas therein. The combustible gas was generated as a result of evaporation of the $LiPF_6$ electrolyte solution, and fire and explosion accidents associated with lithium-ion batteries are primarily attributable to such combustible gas.

Figure 4:
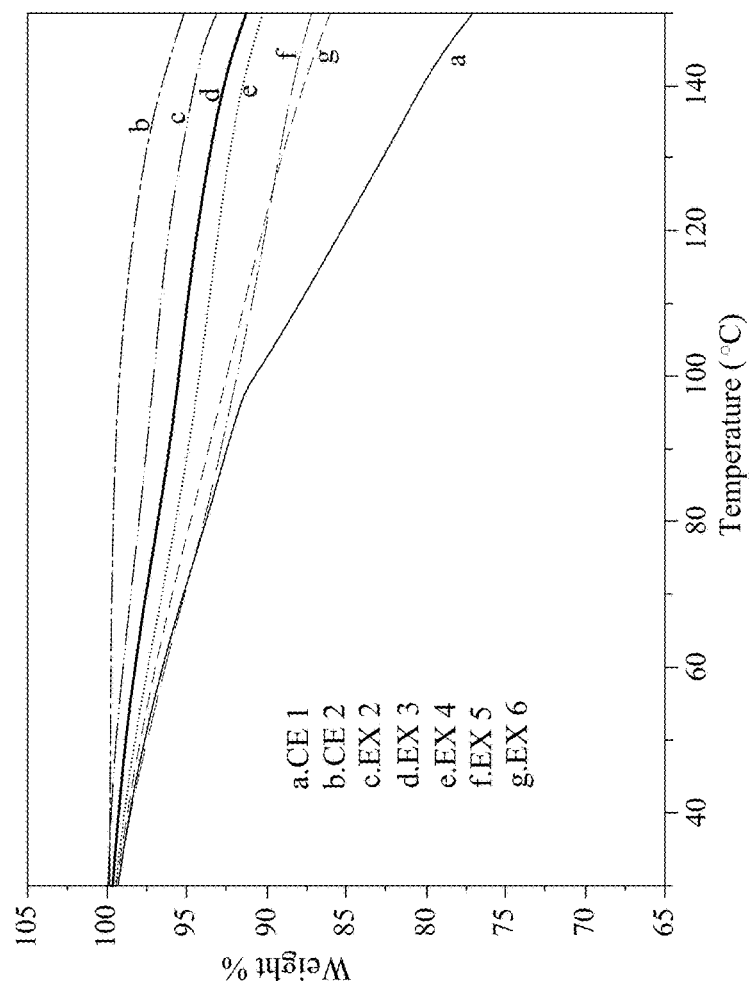
FIG. 4 shows TGA profiles for polymer membranes of Comparative Examples 1 and 2 and Examples 2 to 6, the polymer membranes being soaked with an electrolyte solution.

It can be seen from FIG. 4 that there was a large amount of combustible gas in the electrolyte sample obtained from the commercial separator of Comparative Example 1. The polymer membranes (graft copolymer membranes) of Examples 2 to 6 had much better electrolyte retention in comparison with the commercial separator of Comparative Example 1.

Morphology

Surfaces of the graft copolymer membrane obtained in Example 4 and the commercial separator of Comparative Example 1 were observed using a field emission scanning electron microscope (JEOL, JSM-6380LV). FIG. 5(a) shows a SEM image of the graft copolymer membrane of Example 4, and FIG. 5(b) shows a SEM image of the commercial separator of Comparative Example 1.

Figure 5B:
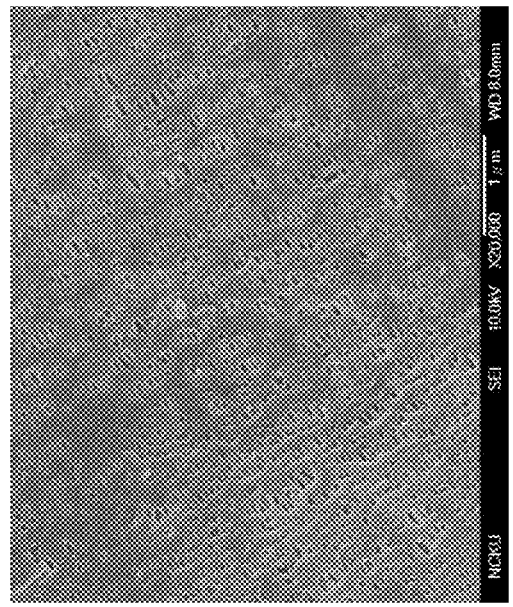
FIGS. 5(*a*) and 5(*b*) show SEM images of the polymer membranes of Example 4 and Comparative Example 1, respectively.
Figure 5A:
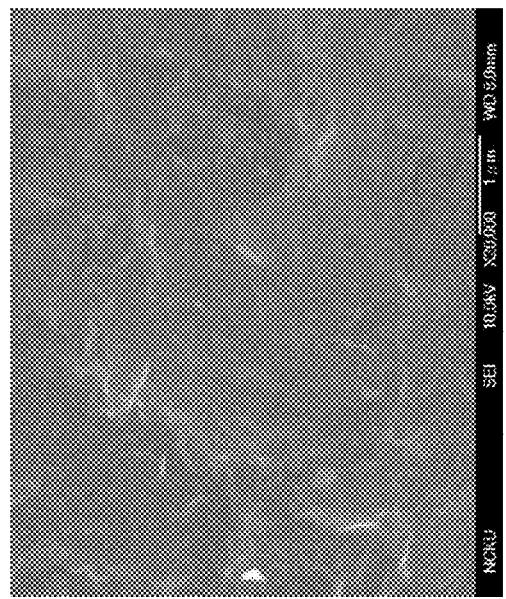

It can be seen from FIGS. 5(a) and 5(b) that the surface of the graft copolymer membrane of Example 4 was non-porous and that the surface of the commercial separator of Comparative Example 1 had a multiplicity of pores ranging from 50 nm to 200 nm. This is the reason why the graft copolymer membranes of Examples 2 to 6 had better electrolyte retention than the polymer membrane of Comparative Example 1.

Crystallinity

Figure 6:
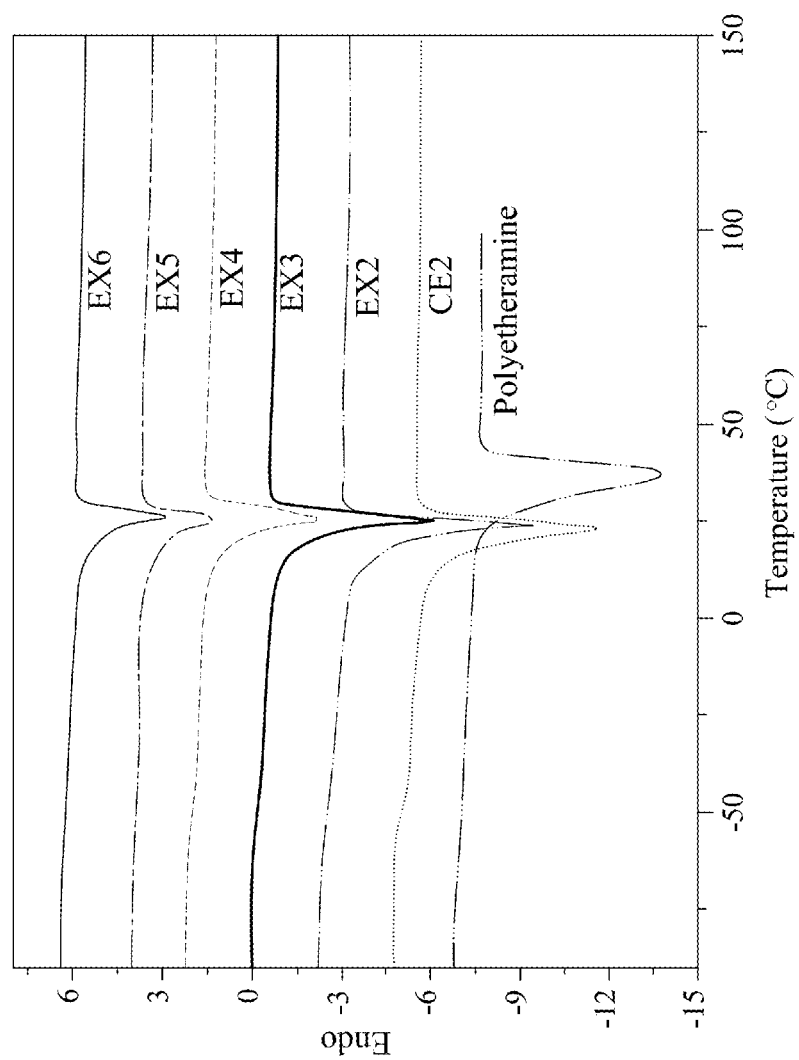
FIG. 6 shows DSC curves for polyetheramine and the polymer membranes of Examples 2 to 6 and Comparative Example 2.

A thermal transition property of a dried polymer membrane (3~5 mg) was measured using a TA Instruments Q100 DSC in a temperature range from −100° C. to 160° C. with the temperature rising at a rate of 10° C./min. DSC curves for the polymer membranes of Examples 2 to 6 and Comparative Example 2 are shown in FIG. 6. A thermal transition property of polyetheramine (Jeffamine ED series, XTJ-502) was also measured.

From the DSC curves, melting enthalpy ($\Delta H$) of EO chain (—$CH_2CH_2O$—) for each polymer membrane can be calculated, and glass transition temperature (Tg) and melting temperature (Tm) can be observed. The data of $\Delta H$, Tg, and Tm are summarized in Table 2.

TABLE 2

| Item | Tg (° C.) | Tm (° C.) | $\Delta H$ (J/g EO) |
|---|---|---|---|
| Polyetheramine | −57.0 | 36.0 | 151.5 |
| CE 2 | −46.0 | 23.0 | 100.8 |
| EX 2 | −44.0 | 23.8 | 88.1 |
| EX 3 | −42.4 | 25.2 | 84.2 |
| EX 4 | −41.6 | 25.5 | 83.3 |
| EX 5 | −41.3 | 25.7 | 78.6 |
| EX 6 | −40.8 | 25.9 | 77.7 |

From the data of $\Delta H$, it was noted that the crystallinity of the polyetheramine deteriorated due to the crosslinking reaction and the existence of the polymer chain (polyacrylonitrile).

Compatibility Test

An interfacial resistance between a gel polymer electrolyte and a lithium metal electrode in a coin cell type battery was measured using AC-impedance spectroscopy. After running three charge-discharge cycles of the coin cell type battery at 0.1 C, an interfacial resistance between the gel polymer electrolyte and the lithium metal electrode was further measured. The interfacial resistances of the coin cell type batteries of Example 12 and Comparative Examples 5 and 6 before charge-discharge cycles are shown in FIG. 7(a). The interfacial resistances after three charge-discharge cycles are shown in FIG. 7(b).

As shown in FIG. 7(a), before the charge-discharge cycles, the interfacial resistances of the coin cell type batteries of Example 12 and Comparative Examples 5 and 6 were fairly similar (about 50 ohm). After three charge-discharge cycles at 0.1 C, the interfacial resistance of the coin cell type battery of Example 12 slightly increased to 85 ohm. However, the interfacial resistances of the coin cell type batteries of Comparative Examples 5 and 6 increased to 190 ohm and 275 ohm, respectively. It can therefore be concluded that the graft copolymer membrane used in the coin cell type battery of Example 12 is less likely to produce a marked increase in electrolyte-electrode interfacial resistance after a number of charge-discharge cycles, and that the gel polymer electrolyte made from the graft copolymer membranes of Examples 2 to 6 may have better compatibility with electrodes of a lithium-ion battery.

Ionic Conductivity Test

Ionic conductivities of a gel polymer electrolyte in a coin cell type battery at different temperatures were determined by electrochemical impedance spectroscopy on an electrochemical instrument (CHI604A, CH Instrument, Inc.) using alternative current signals with a potential amplitude of 10 mV and frequencies from 100 kHz to 10 Hz.

$$\text{Ionic conductivity } (\sigma) = l/RS$$

where l is the thickness of the gel polymer electrolyte, S is the contact area between the gel polymer electrolyte and the stainless steel discs, and R is the bulk resistance of the gel polymer electrolyte.

Figure 8:
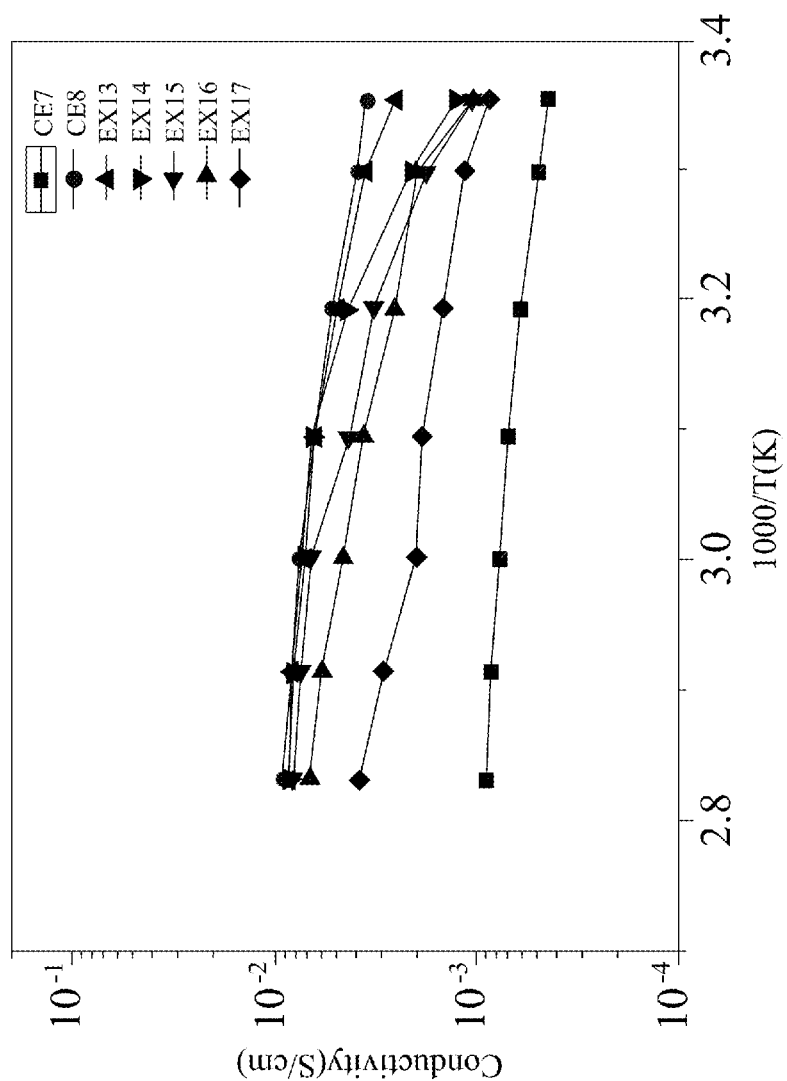
FIG. 8 shows ionic conductivity versus temperature plots for gel polymer electrolytes in coin cell type batteries of Examples 13 to 17 and Comparative Examples 7 and 8.
Figure 9A:
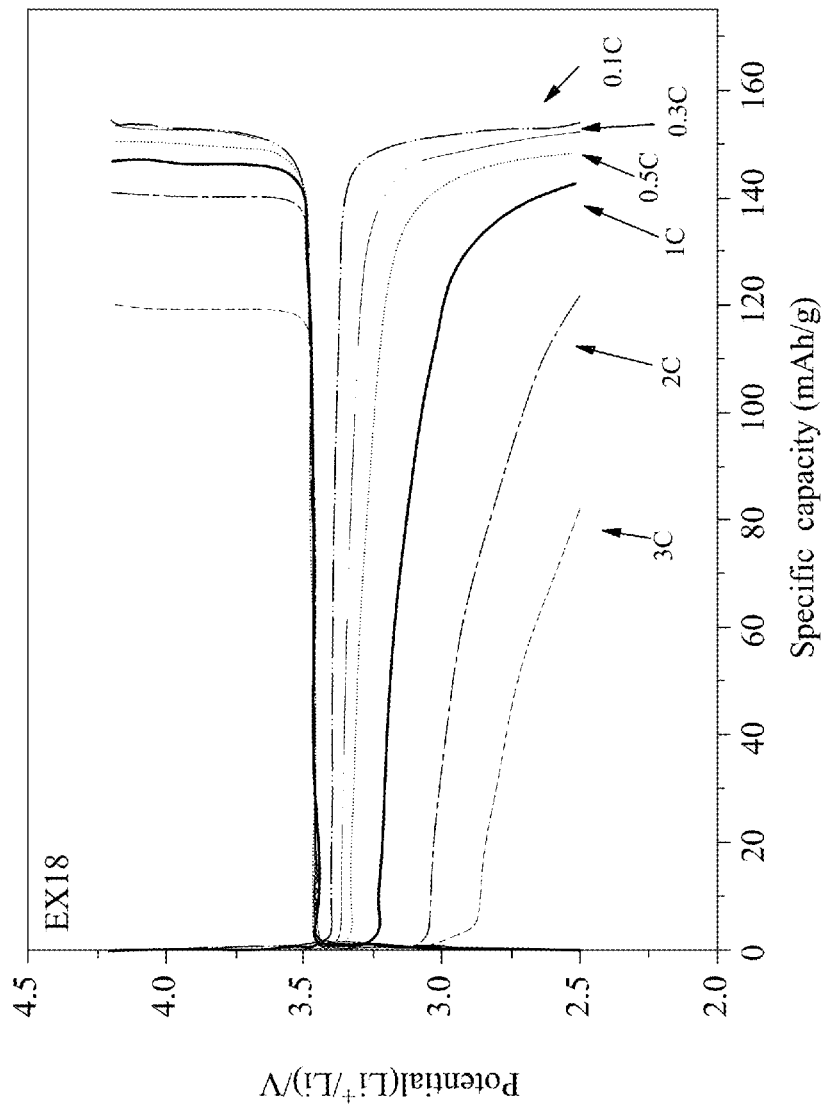
FIGS. 9(*a*) to 9(*g*) are charge-discharge curves for coin cell type batteries of Examples 18 to 22 and Comparative Examples 9 and 10, respectively.
Figure 9B:
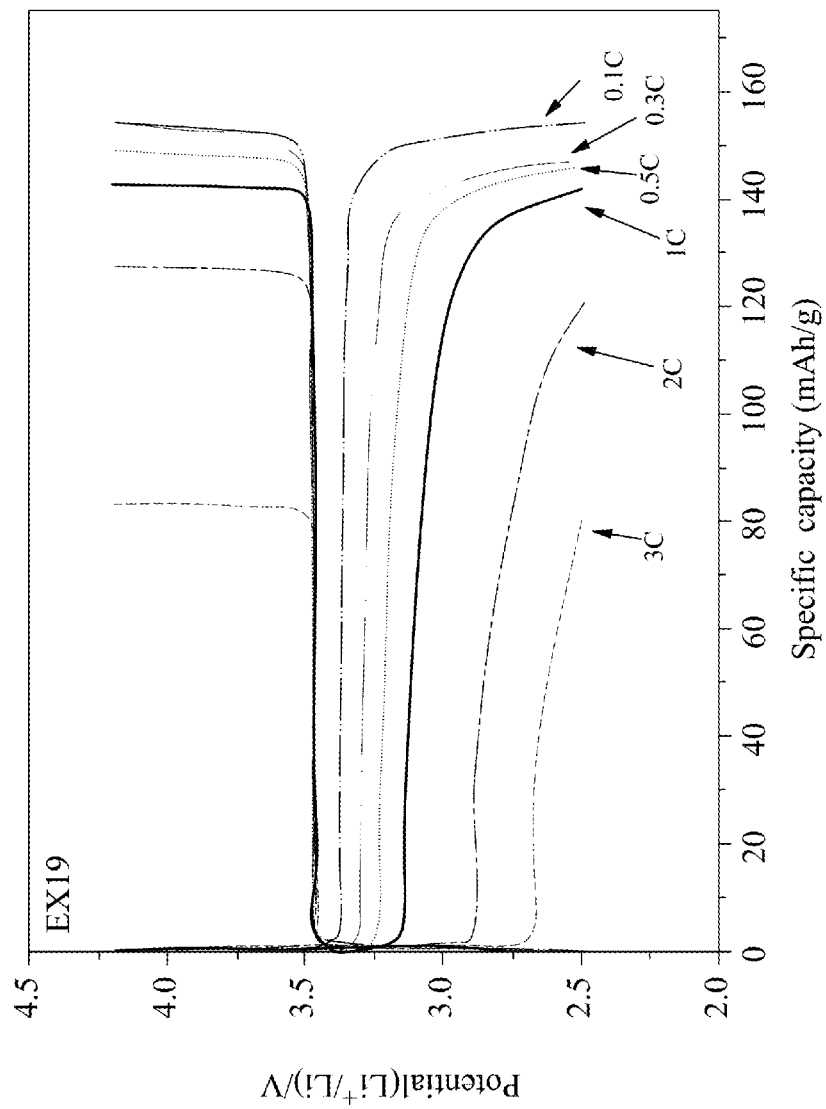
Figure 9C:
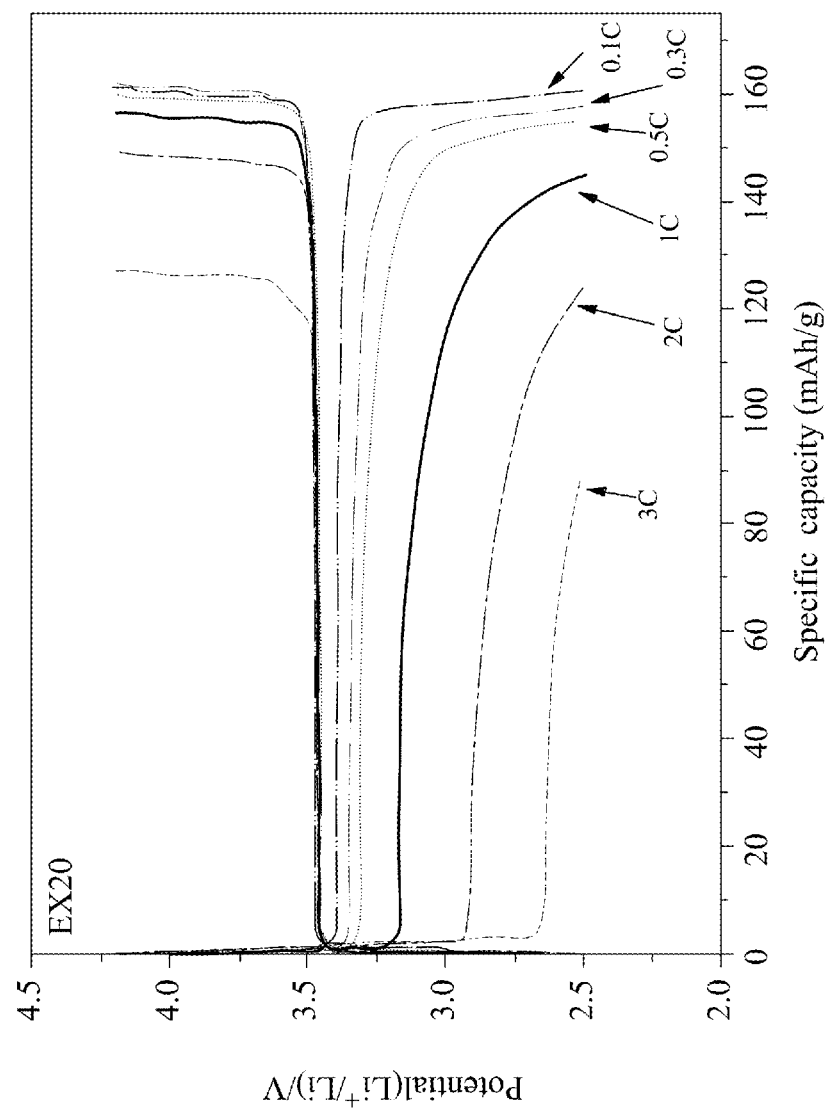
Figure 9D:
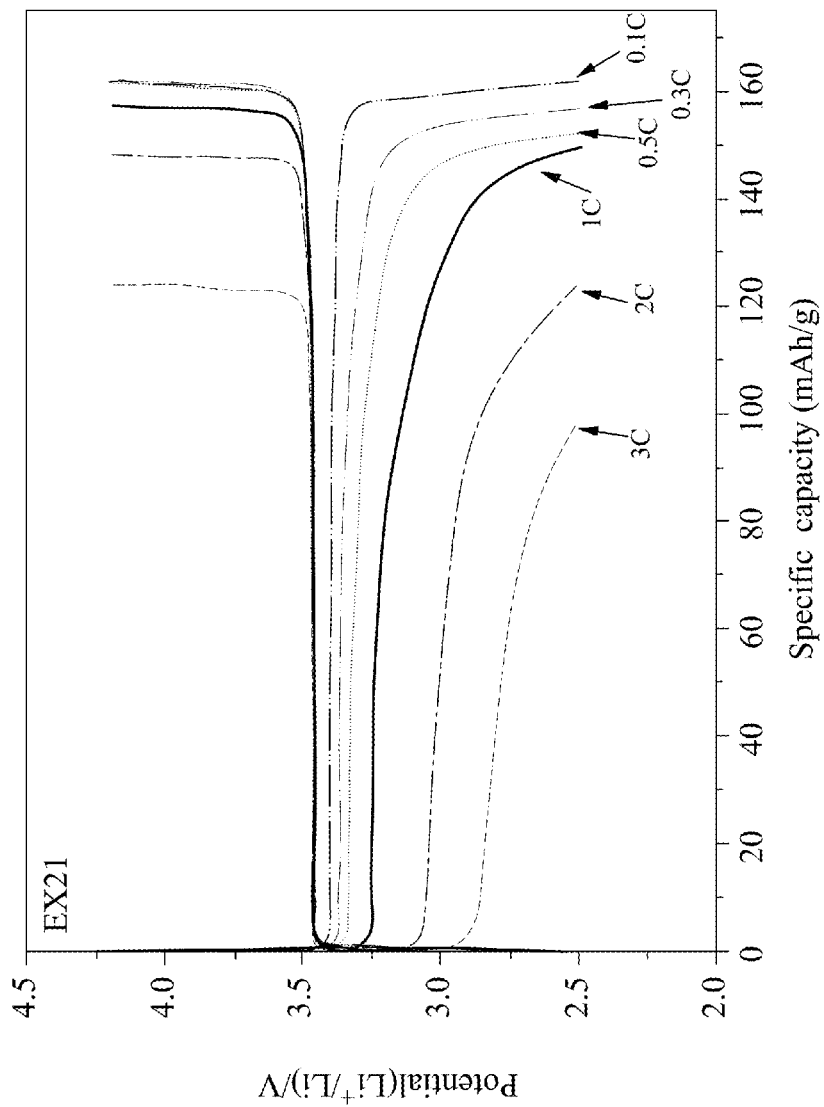
Figure 9E:
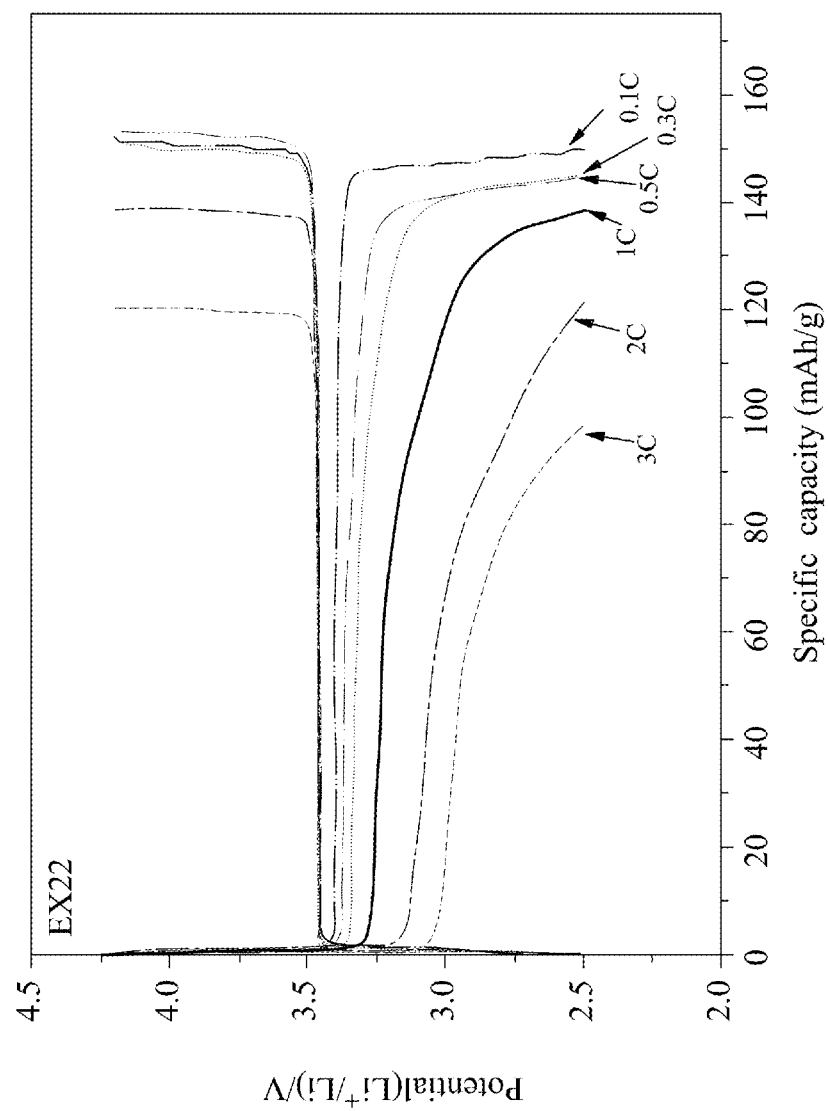
Figure 9F:
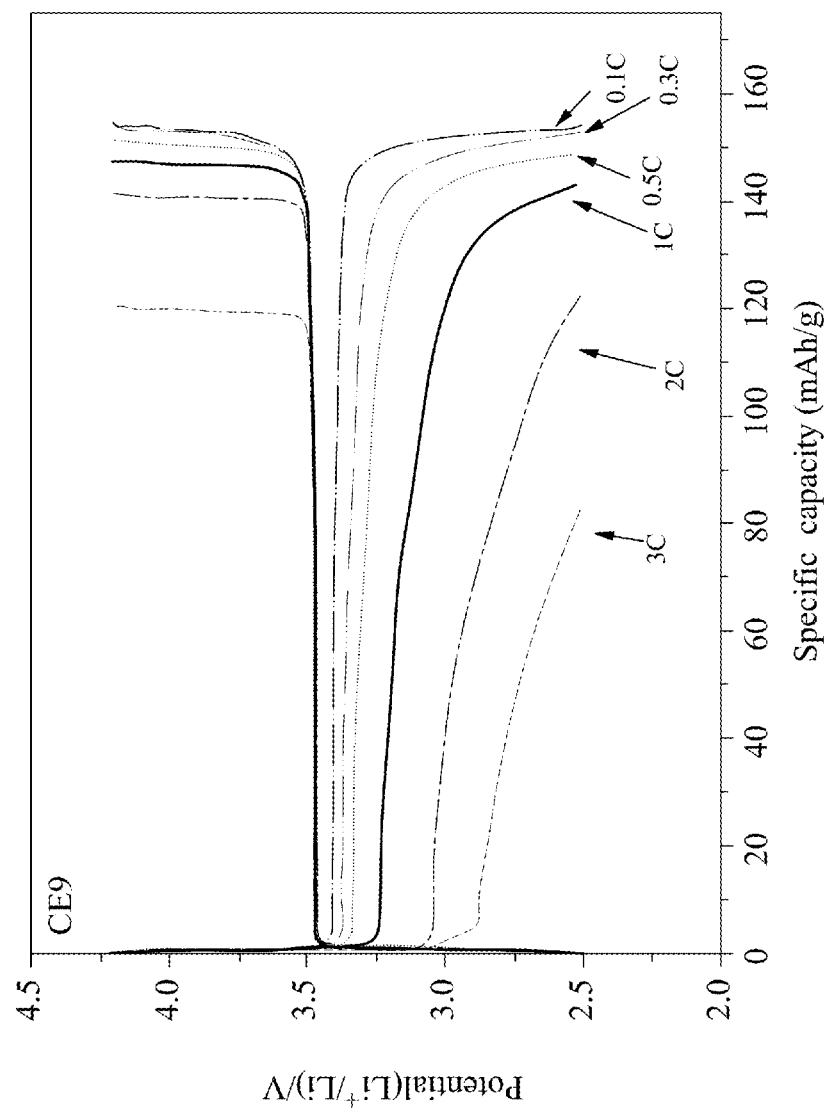
Figure 9G:
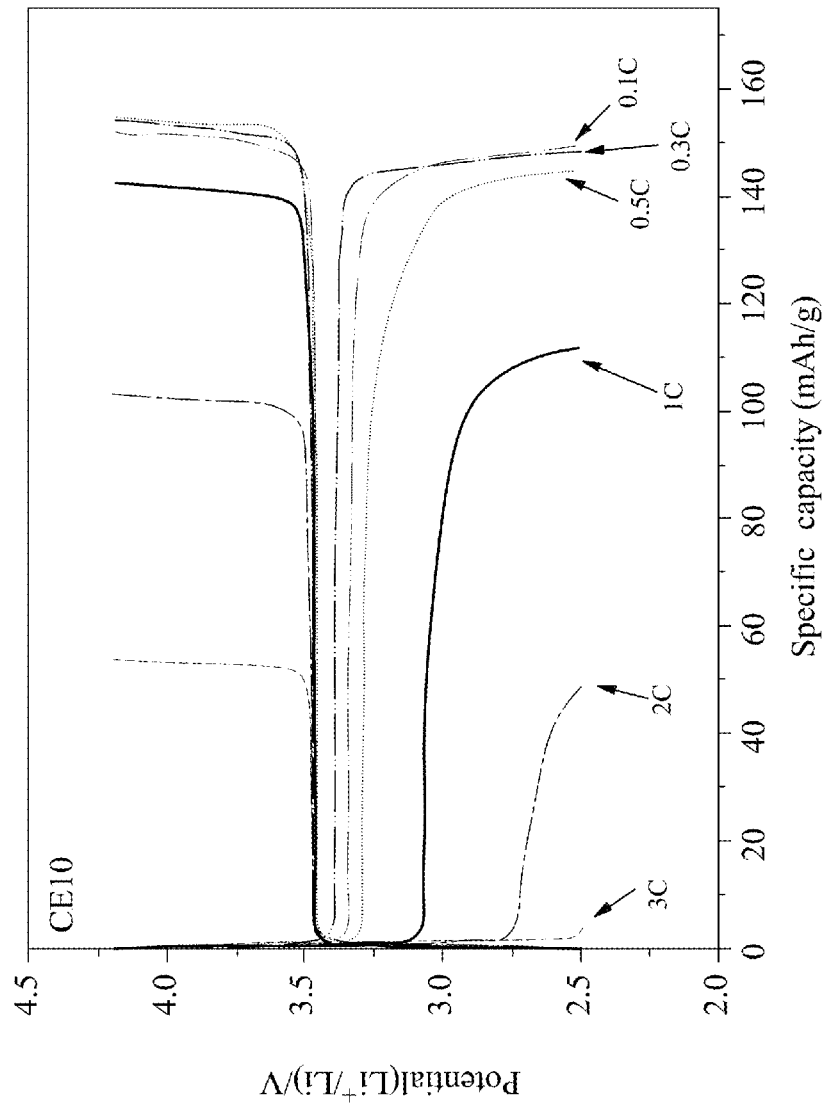

The ionic conductivities at different temperatures (25° C.~80° C.) for the coin cell type batteries of Examples 13 to 17 and Comparative Examples 7 and 8 are shown in FIG. 8. At 25° C., the ionic conductivities of the gel polymer electrolytes in the coin cell type batteries of Examples 13 to 17 ranged from 3.0 mScm$^{-1}$ to 1.0 mScm$^{-1}$, and the ionic conductivities of the gel polymer electrolytes in the coin cell type batteries of Comparative Examples 7 and 8 were 0.45 mScm$^{-1}$ and 5 mScm$^{-1}$, respectively. The ionic conductivities increased with the temperature. At 80° C., the ionic conductivities of the gel polymer electrolytes in the coin cell type batteries of Examples 13 to 17 ranged from 8.0 mScm$^{-1}$ to 4.0 mScm$^{-1}$, and the ionic conductivities of the gel polymer electrolytes in the coin cell type batteries of Comparative Examples 7 and 8 were 0.9 mScm$^{-1}$ and 9.0 mScm$^{-1}$, respectively.

Figure 7:
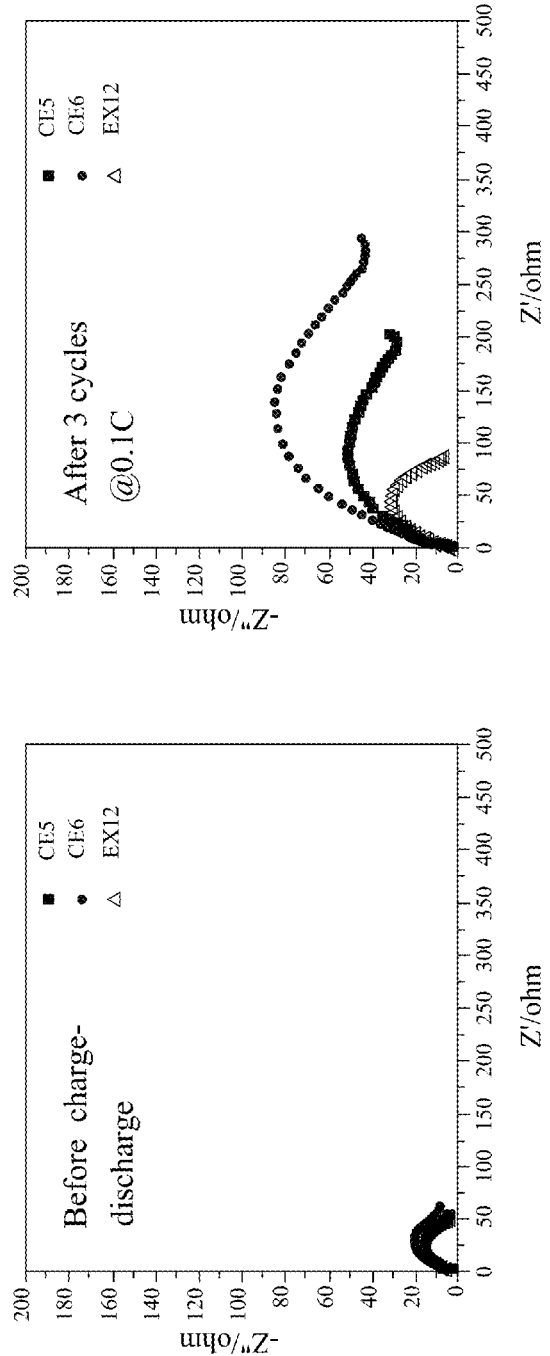
FIG. 7(*a*) shows AC-impedance spectra for coin cell type batteries of Example 12 and Comparative Examples 5 and 6, before charge-discharge cycles.

It can found that the gel polymer electrolytes in the coin cell type batteries of Examples 13 to 17 had ionic conductivities higher than that of Comparative Example 7. Although the gel polymer electrolytes in the coin cell type batteries of Examples 13 to 17 had ionic conductivities lower than that of Comparative Example 8, the gel polymer electrolytes in the coin cell type batteries of Examples 13 to 17 had the graft copolymer membranes of Examples 2 to 6 which had better heat stability (FIG. 2). In addition, the graft copolymer membranes of Examples 2 to 6 can be used to make coin cell type batteries having a wider electrochemical window (FIG. 3). In the coin cell type batteries of Example 12, the gel polymer electrolyte having the graft copolymer membrane of Example 4 has better compatibility with the electrodes of the lithium-ion battery (FIG. 7). Accordingly, the graft copolymer membranes of Examples 2 to 6 are suitable for making a gel polymer electrolyte of a lithium-ion battery.

Battery Capacity Test

A coin cell type battery was charged at 0.1 C, followed by discharging at different discharging rates (0.1 C, 0.3 C, 0.5 C, 1 C, 2 C, and 3 C). This test was performed galvanostatically between 2.5 V and 4.2 V at room temperature on a Battery Automation Test system (Acu Tech Systems, BAT-750B). FIGS. 9(a) to 9(g) are discharge voltage curves for the coin cell type batteries of Examples 18 to 22 and Comparative Examples 9 and 10, respectively. The specific discharge capacities for these coin cell type batteries are summarized in Table 3.

TABLE 3

| Discharging | Specific discharge capacity (mAhg$^{-1}$) | | |
|---|---|---|---|
| rate | 0.1 C | 1 C | 3 C |
| EX 18 | 153 | 141 | 80 |
| EX 19 | 160 | 142 | 90 |
| EX 20 | 161 | 149 | 99 |
| EX 21 | 150 | 139 | 98 |
| EX 22 | 151 | 138 | 100 |
| CE 9 | 154 | 143 | 82 |
| CE 10 | 148 | 111 | 3 |

From the results shown in Table 3, the coin cell type batteries of Examples 18 to 22 had specific discharge capacities comparable to that of Comparative Example 9 (in which the commercial separator was used). Furthermore, when discharging at 3 C, the coin cell type batteries of Examples 18 to 22 had specific discharge capacities much better than that of Comparative Example 10 (in which the polymer chain of polyacrylonitrile was not included in the gel polymer electrolyte).

Long-Term Stability

Figure 10:
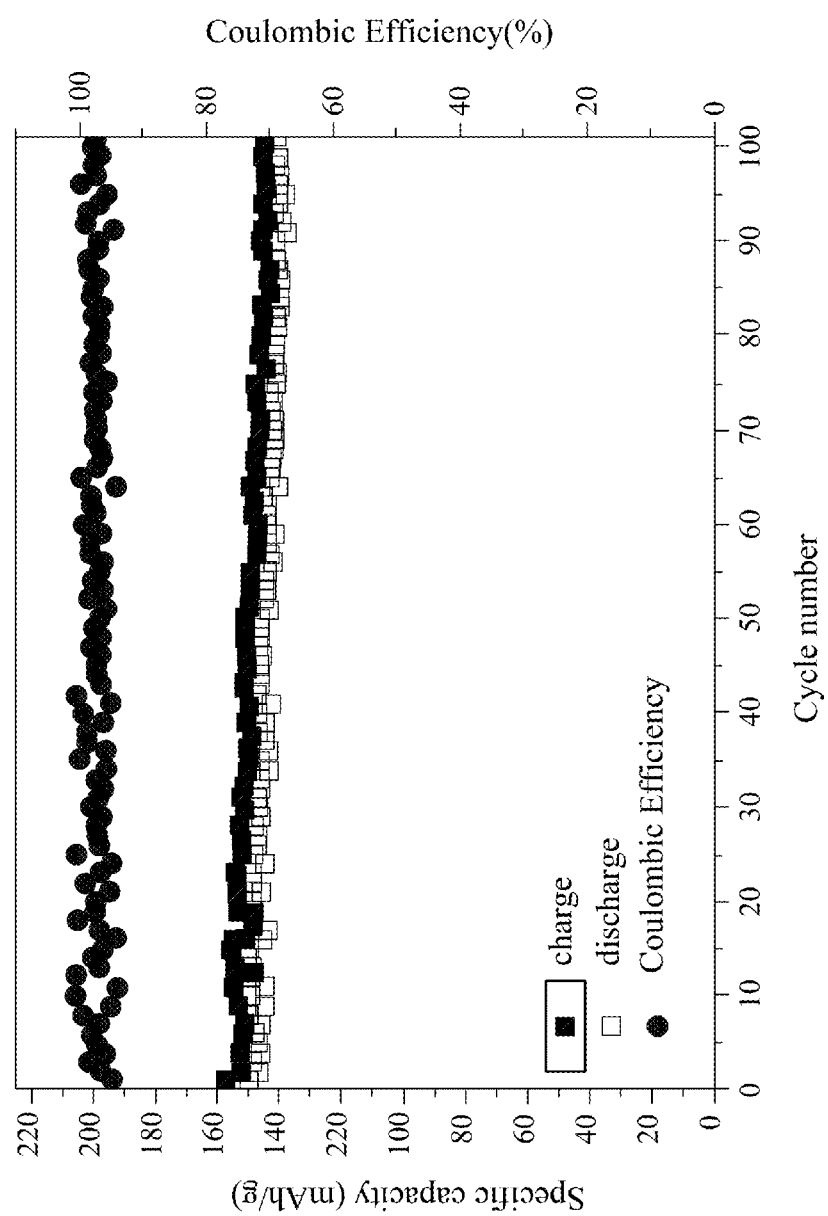
FIG. 10 shows charge-discharge cycling performances for the coin cell type battery of Example 20.

A coin cell type battery obtained in Example 20 was charged at 0.1 C and discharged at 1 C for 100 charge-discharge cycles. This test was also performed galvanostatically between 2.5 V and 4.2 V at room temperature on a Battery Automation Test system (Acu Tech Systems, BAT-750B). The results are shown in FIG. 10.

It can be found that the coin cell type battery of Example 20 had a first discharge capacity of 149 mAhg$^{-1}$. After 100 charge-discharge cycles, the coin cell type battery still had a discharge capacity of 140 mAhg$^{-1}$, and a columbic efficiency of the coin cell type battery was close to 97%, which means a very low level of capacitance value recession. Therefore, the coin cell type battery of Example 20 had excellent reversible charge-discharge cycle performance and battery stability.

Positive Electrode Test

Figure 11A:
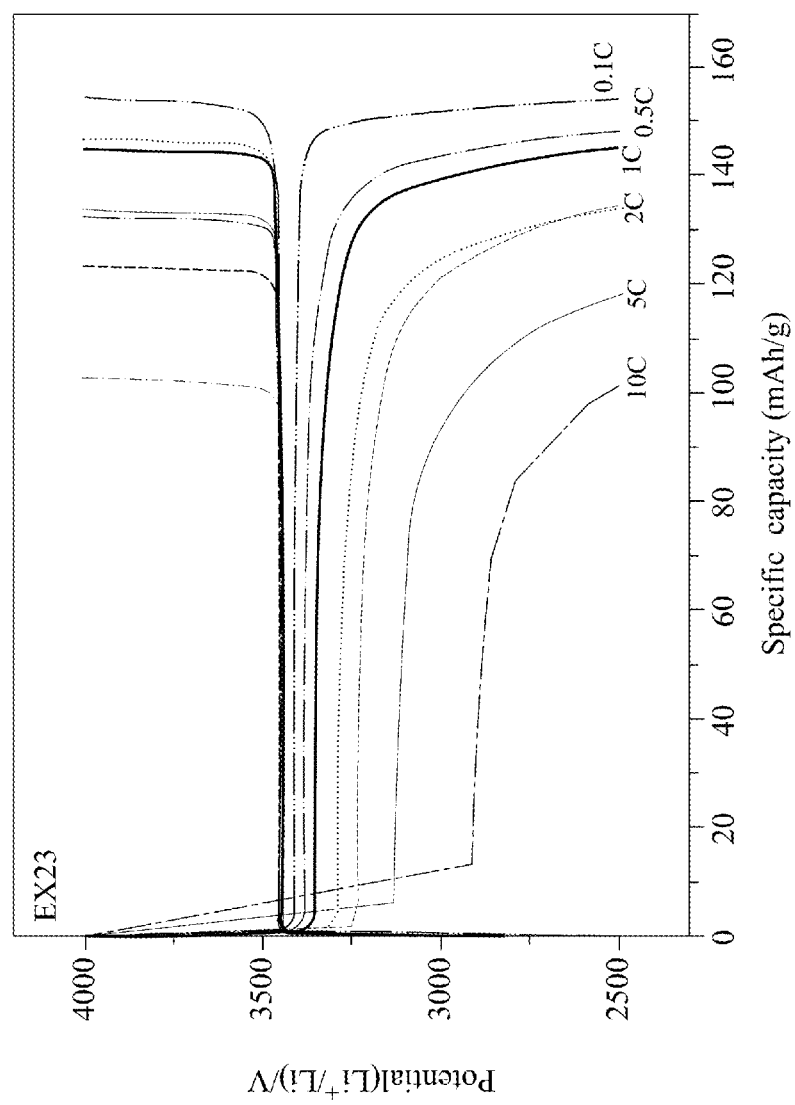
FIGS. 11(*a*) and 11(*b*) are charge-discharge curves for coin cell type batteries of Example 23 and Comparative Example 11, respectively.
Figure 11B:
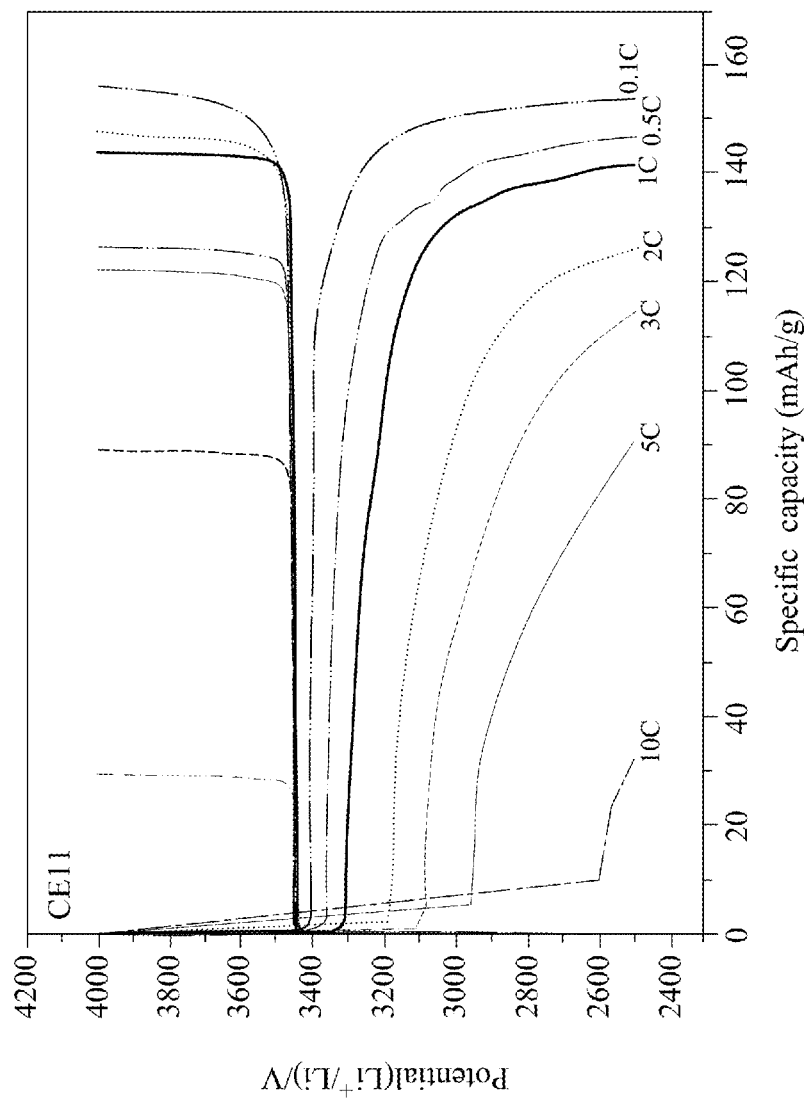

A coin cell type battery was charged at 0.1 C and discharged at different discharging rates (0.1 C, 0.5 C, 1 C, 2 C, 3 C, 5 C, and 10 C). This test was also performed galvanostatically between 2.5 V and 4.0 V at room temperature on a Battery Automation Test system (Acu Tech Systems, BAT-750B). FIGS. 11(a) and 11(b) are discharge voltage curves for the coin cell type batteries of Example 23 and Comparative Examples 11, respectively. The specific discharge capacities for the coin cell type batteries are summarized in Table 4.

TABLE 4

| Discharging | Specific discharge capacity (mAhg$^{-1}$) | | | | | | |
|---|---|---|---|---|---|---|---|
| rate | 0.1 C | 0.5 C | 1 C | 2 C | 3 C | 5 C | 10 C |
| EX 23 | 152 | 148 | 145 | 133 | 128 | 118 | 101 |
| CE 11 | 153 | 147 | 140 | 125 | 114 | 89 | 28 |

It can be noted from Table 4 that when the coin cell type batteries were discharged at a relatively high rate (5 C or 10 C), the specific discharge capacity of the coin cell type battery of Example 23 was much better than that of Comparative Example 11. This means that the intermediate copolymer can be used as a binder of a positive electrode for improving the specific discharging capacity of a lithium-ion battery.

Graphite Electrode Test

Figure 12A:
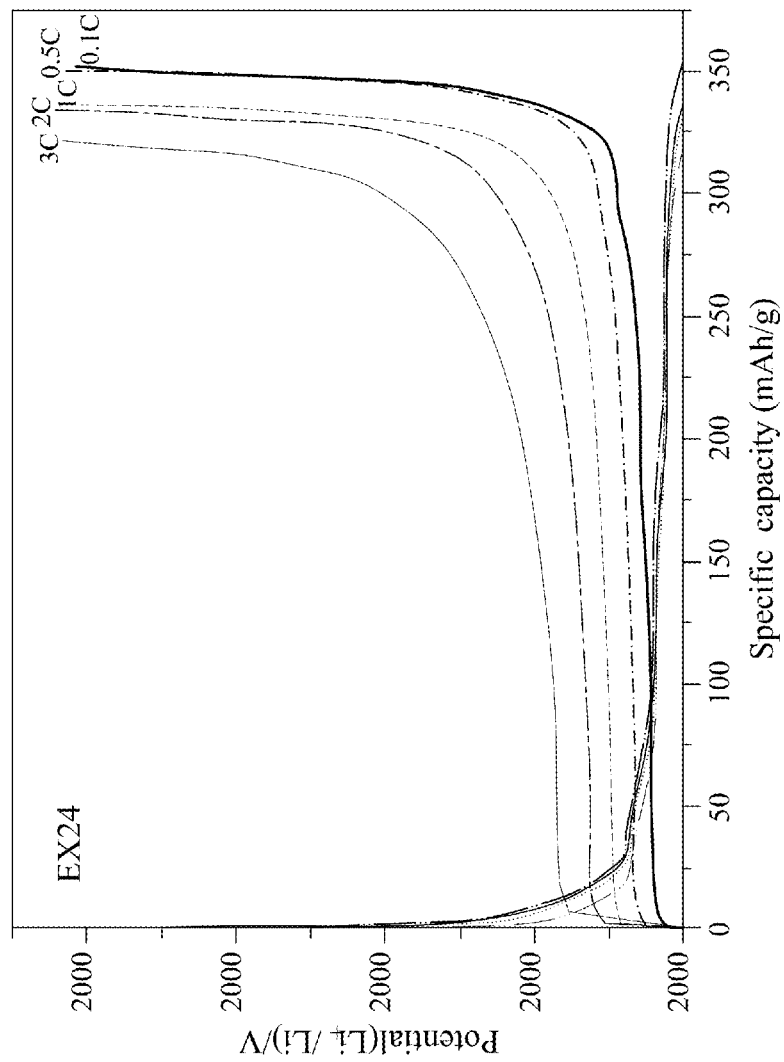
FIGS. 12(*a*) and 12(*b*) are charge-discharge curves for coin cell type batteries of Example 24 and Comparative Example 12, respectively.
Figure 12B:
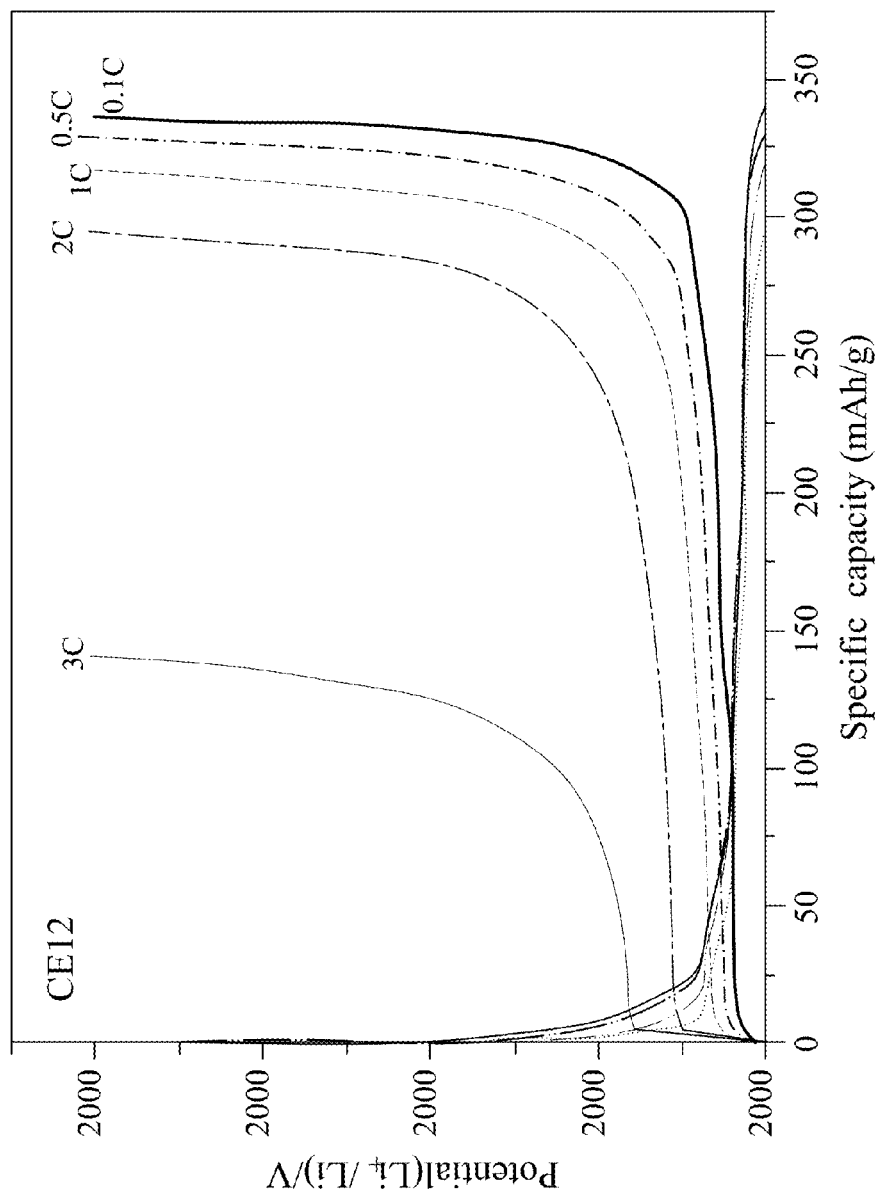

A coin cell type battery was charged at 0.1 C and discharged at different discharging rates (0.1 C, 0.5 C, 1 C, 2 C, and 3 C). This test was also performed galvanostatically between 0 V and 2.0 V at room temperature on a Battery Automation Test system (Acu Tech Systems, BAT-750B). FIGS. 12(a) and 12(b) are discharge voltage curves for the coin cell type batteries of Example 24 and Comparative Examples 12, respectively. The specific discharge capacities for the coin cell type batteries are summarized in Table 5.

TABLE 5

| Discharging | Specific discharge capacity (mAhg$^{-1}$) | | | | |
|---|---|---|---|---|---|
| rate | 0.1 C | 0.5 C | 1 C | 2 C | 3 C |
| EX 24 | 350 | 350 | 335 | 333 | 321 |
| CE 12 | 337 | 325 | 318 | 295 | 141 |

It can be noted from Table 5 that when the coin cell type batteries were discharged at a relatively high rate (3 C), the specific discharge capacity of the coin cell type battery of Example 24 was much better than that of Comparative Example 12. This means that the intermediate copolymer can be used as a binder of a negative/graphite electrode application for improving the specific discharging capacity of a lithium-ion battery.

In summary, a graft copolymer of this invention has nonporous surfaces and good heat stability. A gel polymer electrolyte having the graft copolymer is less likely to have a combustion gas emission problem at a temperature lower than 120° C., and is adapted for producing a safe lithium-ion battery. In addition, the gel polymer electrolyte has a wider electrochemical window, and a high ionic conductivity which is due to (1) high electrolyte uptake amount, (2) high electrolyte retention ability, (3) deteriorated crystallinity, and (4) good compatibility between the gel polymer electrolyte and an electrode. A lithium-ion battery including the gel polymer electrolyte has excellent reversible charge-discharge performance and battery stability.

Furthermore, the intermediate copolymer of the graft copolymer can serve as a binder for positive and negative electrodes of a lithium-ion battery, and is useful in improving a specific discharging capacity of the lithium-ion battery.

While the present invention has been described in connection with what are considered the most practical embodiments, it is understood that this invention is not limited to the disclosed embodiments but is intended to cover various arrangements included within the spirit and scope of the broadest interpretations and equivalent arrangements.

What is claimed is:

1. A graft copolymer comprising a backbone polymer and a branched-chain polymer, and represented by formula (I),

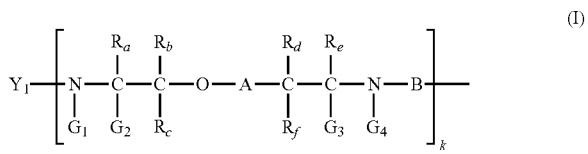

-continued

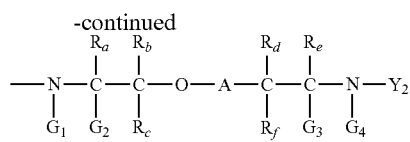

where:
A is represented by $-(X_1)_n-$ and is independently of each repeating unit, in which n is an integral not less than zero, and $X_1$ is represented by

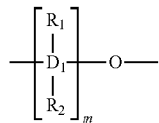

and is independently of each repeating unit, in which
$D_1$ is a carbon atom or a silicon atom,
$R_1$ and $R_2$ are independently —$CH_3$, H, or F when $D_1$ is a carbon atom, and are independently —$CH_3$, -phenyl, —$OCH_3$, or —$OC_2H$, when $D_1$ is a silicon atom, and
m is 1 or 2;
B is represented by

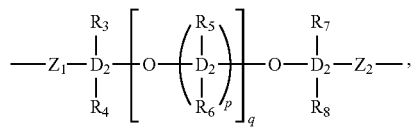

in which
$D_2$ is a carbon atom or a silicon atom,
$R_3$, $R_4$, $R_5$, $R_6$, $R_7$, and R are independently —$CH_3$, H, or F when $D_2$ is a carbon atom, and are independently —$CH_3$, -phenyl, —$OCH_3$, or —$OC_2H_5$ when $D_2$ is a silicon atom,
p is 1 or 2,
q is an integral not less than 1,
$Z_1$ is

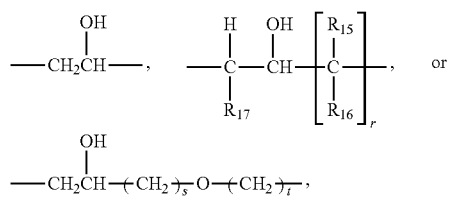

in which $R_{15}$ and $R_{16}$ are independent for each repeating unit, $R_{15}$, $R_{16}$, and $R_{17}$ are independently H or alkyl, and r, s, and t are each an integral not less than 1, and $Z_2$ is

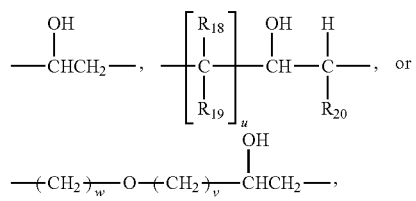

in which $R_{18}$ and $R_{19}$ are independent for each repeating unit, $R_{18}$, $R_{19}$, and $R_{20}$ are independently H or alkyl, and u, v, and w are each an integral not less than 1;
$R_a$, $R_b$, $R_c$, $R_d$, $R_e$, and $R_f$ are independently H or alkyl;
k is an integral not less than 1; and
$G_1$, $G_2$, $G_3$, and $G_4$ are independent for each repeating unit, and $G_1$, $G_2$, $G_3$, $G_4$, $Y_1$, and $Y_2$ are independently H, alkyl, or a polymer chain selected from the group consisting of polyacrylonitrile and a derivative thereof, polyvinylsulfonic acid and a derivative thereof, polyacrylate and a derivative thereof, and polyvinylphosphonic acid and a derivative thereof.

2. The graft copolymer according to claim 1, wherein A is represented by

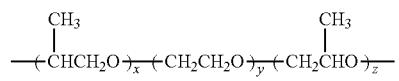

where x, y, and z are each an integral not less than zero.

3. The graft copolymer according to claim 1, wherein B is represented by

4. The graft copolymer according to claim 1, wherein at least one of $G_1$, $G_2$, $G_3$, and $G_4$, in at least one of the repeating units is the polymer chain.

5. The graft copolymer according to claim 1, wherein the polymer chain is polyacrylonitrile.

6. The graft copolymer according to claim 1, wherein $R_a$ and $R_e$ are each a methyl group, and $R_b$, $R_c$, $R_d$, and $R_f$ are each hydrogen atom.

7. A process for preparing a gel polymer electrolyte, comprising a step of soaking the graft copolymer as claimed in claim 1 with a lithium ion containing electrolyte.

8. The process according to claim 7, wherein the lithium ion containing electrolyte includes lithium hexafluorophosphate.

* * * * *